United States Patent
Dokai

(10) Patent No.: US 9,563,416 B2
(45) Date of Patent: Feb. 7, 2017

(54) INFORMATION PROCESSING APPARATUS, METHOD OF CONTROLLING THE SAME AND NON-TRANSITORY COMPUTER READABLE MEDIUM

(71) Applicant: CANON KABUSHIKI KAISHA, Tokyo (JP)

(72) Inventor: Hitoshi Dokai, Hachioji (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/960,522

(22) Filed: Dec. 7, 2015

(65) Prior Publication Data
US 2016/0162274 A1  Jun. 9, 2016

(30) Foreign Application Priority Data

Dec. 8, 2014 (JP) ................. 2014-248420

(51) Int. Cl.
| G06F 9/445 | (2006.01) |
| G06F 9/44 | (2006.01) |
| G06F 11/14 | (2006.01) |

(52) U.S. Cl.
CPC .............. *G06F 8/61* (2013.01); *G06F 9/4448* (2013.01); *G06F 11/14* (2013.01); *G06F 9/44521* (2013.01)

(58) Field of Classification Search
CPC ....................................................... G06F 8/61
USPC ................................................. 717/174, 175
See application file for complete search history.

(56) References Cited

U.S. PATENT DOCUMENTS

| 8,583,559 B2 * | 11/2013 | Nakashima | G06F 21/121 705/51 |
| 8,930,067 B1 * | 1/2015 | Green | G06Q 20/127 345/168 |
| 9,111,101 B2 * | 8/2015 | Koga | G06F 21/602 |
| 2010/0073724 A1 * | 3/2010 | Kurata | G06F 3/1204 358/1.15 |

(Continued)

FOREIGN PATENT DOCUMENTS

| JP | 20109553 A | * | 6/2008 |
| JP | 2010009553 A | | 1/2010 |

OTHER PUBLICATIONS

OSGi Alliance, "OSGi Service Platform Release 4", <URL: http://www.osgi.org/Download/Release4V40>. Cited in Specification, and retrieved on Dec. 4, 2015.

*Primary Examiner* — Phillip H Nguyen
(74) *Attorney, Agent, or Firm* — Rossi, Kimms & McDowell LLP

(57) ABSTRACT

An information processing apparatus having a safe mode for operation restricting a function of a bundle more than in a normal operation mode, comprises: an installation unit that installs a host bundle, and inactivates, as a temporary install, a fragment bundle added to the host bundle in order to extend a function of the host bundle, and stores the fragment bundle in a first memory area; and a holding unit that holds a list defining whether the temporarily installed fragment bundle is activated or inactivated when the information processing apparatus starts in the safe mode, wherein the installation unit, when the information processing apparatus starts in the safe mode, moves a fragment bundle defined to be activated in the list, out of temporarily installed fragment bundles, to a second memory area to activate that fragment bundle.

10 Claims, 19 Drawing Sheets

(56) References Cited

U.S. PATENT DOCUMENTS

| | | | | |
|---|---|---|---|---|
| 2011/0004874 A1* | 1/2011 | Nakashima | ........... | G06F 21/121 717/175 |
| 2013/0024854 A1* | 1/2013 | Kumagai | .................. | G06F 8/67 717/174 |
| 2013/0159891 A1* | 6/2013 | Farrell | ....................... | G06F 8/38 715/762 |
| 2015/0355894 A1* | 12/2015 | Hayami | .................... | G06F 8/62 717/174 |

* cited by examiner

INFORMATION PROCESSING APPARATUS, METHOD OF CONTROLLING THE SAME AND NON-TRANSITORY COMPUTER READABLE MEDIUM

BACKGROUND OF THE INVENTION

Field of the Invention

The present invention relates to an information processing apparatus, a method of controlling the same, and a non-transitory computer readable medium.

Description of the Related Art

In recent years, in image forming apparatuses, application (hereinafter "app") operation environments as typified by a Java (registered trademark) environment are provided. With the aim of improving the functions and usability of the image forming apparatus, apps that operate in an environment such as a Java (registered trademark) environment are created, and by installing them in the image forming apparatus, desired functions can be realized. As an app platform, there is OSGi (Open Service Gateway Initiative) which is a Java (registered trademark) app platform directed to embedded devices. In OSGi, a bundle is defined as a software module management unit, and specifications are defined for management of a life cycle comprising install/start/stop/update/uninstall.

Conventionally, in an operating system (OS) that operates in a personal computer (PC) or the like, there are cases in which the system itself crashes, or behavior becomes unstable due to an error in a setting of an app, a driver, or the like. For example, in the case where a plurality of drivers that use the same hardware resources are installed, there is the possibility of falling into these kinds of situations due to contention between drivers over hardware resources upon starting up. Further, the system itself cannot start without cancelling such a state, and so the system falls into a situation from which it cannot be recover.

In order to prevent falling into a situation as described above, an OS comprises a mode (hereinafter referred to as "safe mode") which is separate from a normal operation mode (hereinafter referred to as "normal mode") in which the system starts up which comprises only minimum drivers, system services, or the like. By starting up in the safe mode, the driver that is causing the malfunction is deleted, settings of driver, apps, or the like can be changed, and the cause of a system crash, an operation instability or the like can be avoided.

Meanwhile, in embedded devices such as image forming apparatuses, there are cases in which due to a user installing an app, a state of operation instability is fallen into caused by conflict between apps over resources, service registration, and usage order, or the like. As a means of recovery, an arrangement for starting up in a safe mode has been proposed (Japanese Patent Laid-Open No. 2010-009553). However, there is an arrangement in which for types of OSGi bundles there is a host bundle and a fragment bundle, and in a case where these apps are handled, it is necessary to consider restricting to fragment bundles as described below. A fragment bundle is a bundle of a format in which the bundle itself is added (attached) to a class loader space of a host bundle. The fragment bundle does not operate alone, but rather the fragment bundle can also be put into a started state when the host bundle enters a started state. Also, in order to put the fragment bundle in a stopped state, it is necessary to put the host bundle in a stopped state, or to uninstall the fragment bundle. These specifications are required as stipulations of OSGi, and a fragment bundle in a stopped state cannot be installed for a host bundle in a started state.

In the specifications described above, there was the problem that, in a case where there is a problem in the fragment bundle even where there is no problem in the host bundle itself, the starting of the host bundle would fail, and the system could not start normally, and therefore the system would fall into a situation from which it could not recover. For example, there are cases where for a host bundle started upon a safe mode start that is pre-installed in the system, a fragment bundle for which there is a problem is installed by a user.

SUMMARY OF THE INVENTION

In view of the above described problem, the present invention enables a system to start safely in a safe mode even in a case where a fragment bundle for which there is a problem is installed.

According to one aspect of the present invention, there is provided an information processing apparatus having a normal operation mode, and a safe mode for operation restricting a function of a bundle more than in the normal operation mode, the apparatus comprising: an installation unit configured to install a host bundle, and to inactivate, as a temporary install, a fragment bundle added to the host bundle in order to extend a function of the host bundle, and to store the fragment bundle in a first memory area; and a holding unit configured to hold a list defining whether the temporarily installed fragment bundle is activated or inactivated when the information processing apparatus starts in the safe mode, wherein the installation unit, when the information processing apparatus starts in the safe mode, moves a fragment bundle defined to be activated in the list, out of temporarily installed fragment bundles, to a second memory area to activate that fragment bundle.

According to another aspect of the present invention, there is provided a method for controlling an information processing apparatus having a normal operation mode, and a safe mode for operation restricting a function of a bundle more than in the normal operation mode, the apparatus comprising: installing a host bundle, and inactivating, as a temporary install, a fragment bundle added to the host bundle in order to extend a function of the host bundle, and storing the fragment bundle in a first memory area, wherein in the installing, when the information processing apparatus starts in the safe mode, a fragment bundle, out of temporarily installed fragment bundles, that is defined to be activated in a list defining whether to activate or inactivate when the information processing apparatus starts in the safe mode is caused to move to a second memory area to activate that fragment bundle.

According to another aspect of the present invention, there is provided a non-transitory computer-readable storage medium storing a program for causing a computer having a normal operation mode, and a safe mode for operation restricting a function of a bundle more than in the normal operation mode, to function as: an installation unit configured to install a host bundle, and to inactivate, as a temporary install, a fragment bundle added to the host bundle in order to extend a function of the host bundle, and to store the fragment bundle in a first memory area; and a holding unit configured to hold a list defining whether the temporarily installed fragment bundle is activated or inactivated when the computer starts in the safe mode, wherein the installation unit, when the computer starts in the safe mode, moves a fragment bundle defined to be activated in the list, out of temporarily installed fragment bundles, to a second memory area to activate that fragment bundle.

By virtue of the present invention, even in a case where a fragment bundle for which there is a problem is installed, the convenience of a user is not degraded, and it is possible to start the system safely in a safe mode start.

Further features of the present invention will become apparent from the following description of exemplary embodiments (with reference to the attached drawings).

DESCRIPTION OF THE EMBODIMENTS

Hereinafter, embodiments for working the present invention are explained using drawings. Firstly, terms that will be used in the present specification will be defined.

A "host bundle" is a bundle which is a target of the addition of a fragment bundle. Note that a "bundle" indicates a Java (registered trademark) module, and in the present specification it will be used to means the same thing as an app.

A "fragment bundle" is a bundle that does not operate independently, but rather is added to a class loader space of a host bundle.

Adding a fragment bundle to a host bundle, i.e. attaching to a host bundle, is referred to as "installing a fragment bundle". Furthermore, this state is referred to as "the fragment bundle is activated".

Deleting a fragment bundle in a state in which it is added to a host bundle is referred to as "uninstalling a fragment bundle".

Installing a fragment bundle in a state in which it is not attached to a host bundle is referred to as "temporarily installing a fragment bundle". Furthermore, this state is referred to as "the fragment bundle is inactivated".

A "general app" indicates a bundle installed by a user rather than a bundle that is pre-installed in the system.

A "system app" indicates a bundle that is pre-installed in the system.

First Embodiment

Using FIG. 1 to FIG. 7, explanation will be given for fragment bundle installation, and activation/inactivation which is common to each embodiment shown below. Also, using FIG. 8 and FIG. 9, explanation will be given for starting of a host bundle which is a basic form of a safe mode.

[System Configuration]

Figure 1:
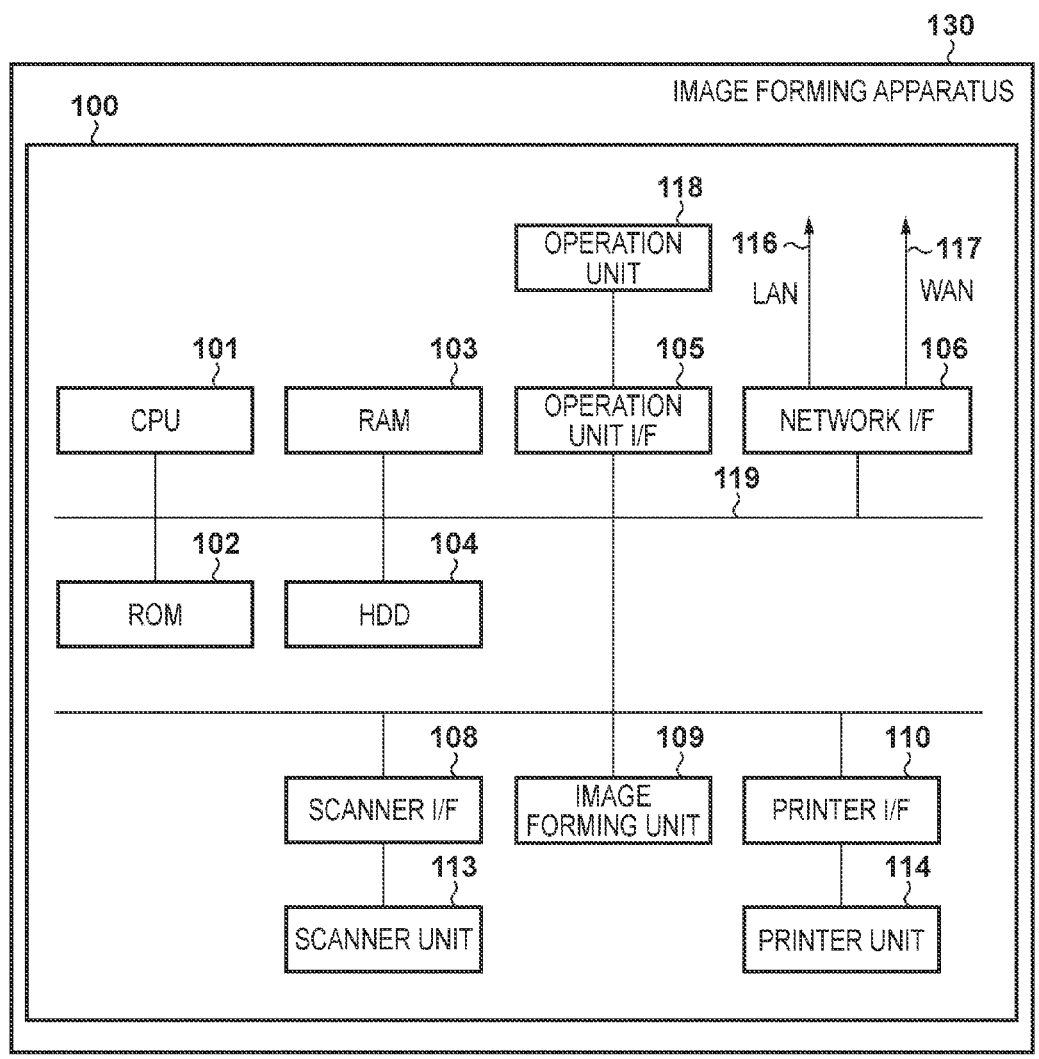
FIG. 1 is a view for illustrating an example of a hardware configuration of an image forming apparatus.

FIG. 1 is a view for illustrating an example of a hardware configuration of an image forming apparatus 130 as an information processing apparatus. The image forming apparatus 130 comprises a print function, a scan function, a network communication function, or the like. A controller 100 is a controller of the image forming apparatus 130. The controller 100 is connected electronically with a scanner unit 113 and a printer unit 114, and is connected with an external device via a LAN 116 as well. A CPU 101 comprehensively controls access to various connected hardware based on a control program stored in a ROM 102. Also, the CPU 101 comprehensively controls various processing performed within the controller 100.

Figure 3:
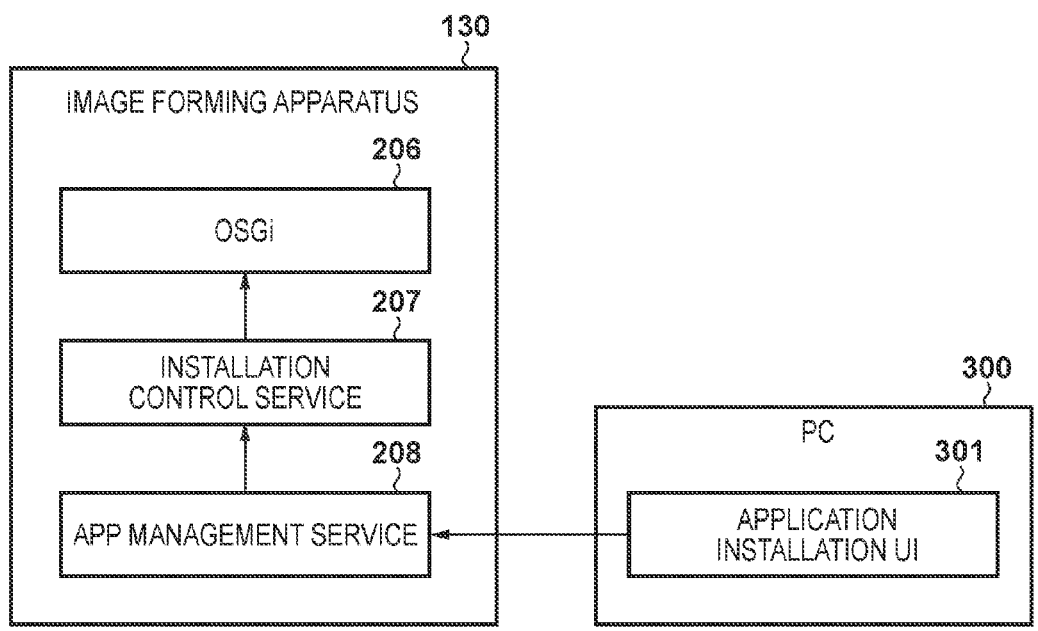
FIG. 3 is a view for illustrating a flow for installing an app.

The ROM 102 is a read-only non-volatile storage area, and stores a boot program of the image forming apparatus 130, or the like. A RAM 103 is a system work memory for the CPU 101 to operate, and is a memory for temporarily storing various data. The RAM 103 is configured by an FRAM and an SRAM capable of holding stored content even after a power supply is turned off, a DRAM whose storage contents are deleted after the power supply is turned off, or the like. An HDD 104 is a non-volatile storage area, and stores system apps, or the like. Firmware including installed apps that are explained in FIG. 3 is stored in the HDD 104.

An operation unit I/F 105 is an interface unit connecting a system bus 119 and an operation unit 118. More specifically, the operation unit I/F 105 receives and displays data to be displayed on the operation unit 118 from the system bus 119, and also outputs input information from the operation unit 118 to the system bus 119. A user instruction to the image forming apparatus 130, an information presentation, or the like, is performed via the operation unit 118. A network I/F 106 is connected to the LAN 116, a WAN 117, and the system bus 119, and performs input/output of information with an external unit. A scanner I/F 108 performs correction, processing, and editing of image data received from the scanner unit 113.

An image forming unit 109 performs orientation conversion, image compression, decompression or the like on image data. A printer I/F 110 receives image data sent from the image forming unit 109, and outputs to the printer unit 114 which performs a print operation. A USB interface (not shown) is a general purpose interface that connects various peripheral devices to the image forming apparatus 130, and performs control of a connection USB (Universal Serial Bus). Here, a flash memory (not shown) is connected to the USB interface.

Figure 2:
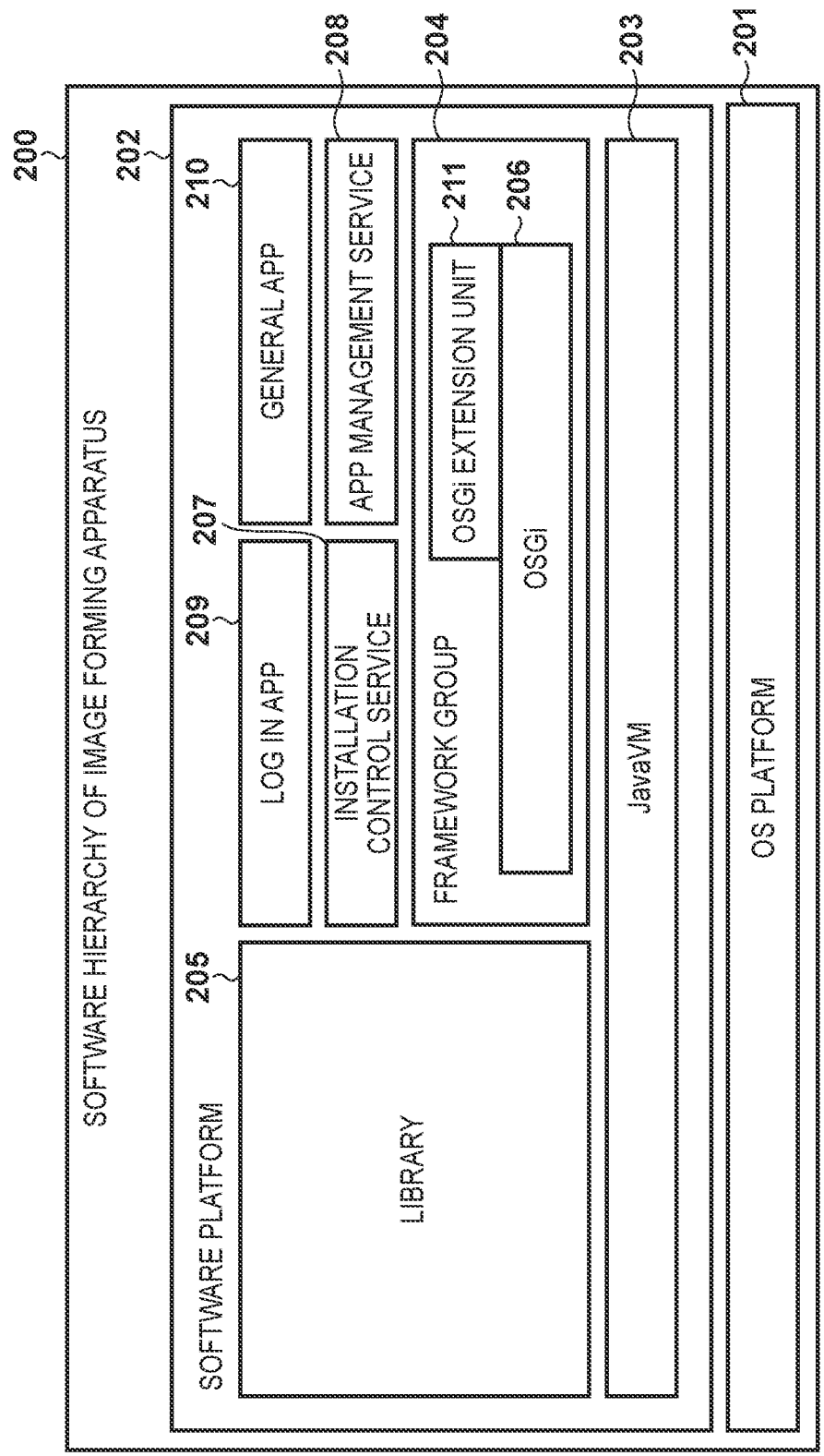
FIG. 2 is a software module hierarchical view of an image forming apparatus.

FIG. 2 is a conceptual diagram of a software module hierarchy 200 of the image forming apparatus 130. Note that, the software illustrated from FIG. 2 is saved in the ROM 102 or the HDD 104 and is executed by the CPU 101. Also, various information used upon execution is held in the RAM 103 or the HDD 104, and the exchange of various information between software functions is performed. Furthermore, communication with an external device is performed using the network I/F 106.

Next, explanation is given for each software unit. The image forming apparatus 130 comprises an OS platform 201, and a software platform 202 is configured on top of the OS platform 201. The software platform 202 is configured as a runtime environment of a Java VM 203 which is a Java (registered trademark) virtual machine, and is configured by providing the Java VM 203 as an interpreter, and providing a framework group 204, and a library 205. The library 205 is configured to include standard API (Application Programming Interface) libraries. The framework group 204 is configured to include an OSGi 206. The OSGi 206 causes a plurality of apps to operate on the single Java VM 203. Furthermore, an OSGi extension unit 211 indicates that it is possible to extend a function as necessary with respect to the OSGi 206. The OSGi 206 provides management of the life cycle of apps and an inter-app communication function. On the OSGi 206, a plurality of system services are pre-installed. As a system service there is an app management service 208 for managing a plurality of app groups, adding new apps, updating, and deleting. The app management service 208 uses an installation control service 207 to perform app addition, updating, and deletion. Upon the starting up of the image forming apparatus 130, the OSGi 206, in accordance with a service start order list saved in the HDD 104, sequentially starts services such as a log in app 209, the installation control service 207, and the app management service 208. The service start order list in accordance with the present invention will be explained later.

The log in app 209 manages a logged in user. The log in app 209 has the characteristic that it cannot stop in consideration of the possibility of a login information query at an arbitrary timing from any app during login. Hypothetically, in a case where the log in app 209 was stopped, login information could not be obtained, and therefore, for example, in a case of an app that uses data associated with the login information, data obtainment would fail and a trouble would occur in that operation. Here, the login information indicates information such as a login name or a mail address of a user, or the like, who is currently logged-in to the image forming apparatus 130. Because the log in app 209 has the characteristics described above, at least one operates when the image forming apparatus 130 starts up.

A general app 210 provides various functions to a user in the image forming apparatus 130. As examples of the general app 210, there are image processing and compression apps, apps that perform department management such as a printing restriction, or the like. The general app 210 operates under the management of the app management service 208. The app management service 208 holds license information, app information, including version information of apps added as management targets, or the like. Furthermore, the app management service 208 responds to an instruction to uninstall an app in the image forming apparatus 130, and removes the general app 210 from the management target. The general app 210 and the log in app 209 can be provided in the form of a host bundle or a fragment bundle as is described in FIG. 4.

FIG. 3 is the view for illustrating a flow for when a user installs an app in the image forming apparatus 130 from a PC 300.

Figure 5:
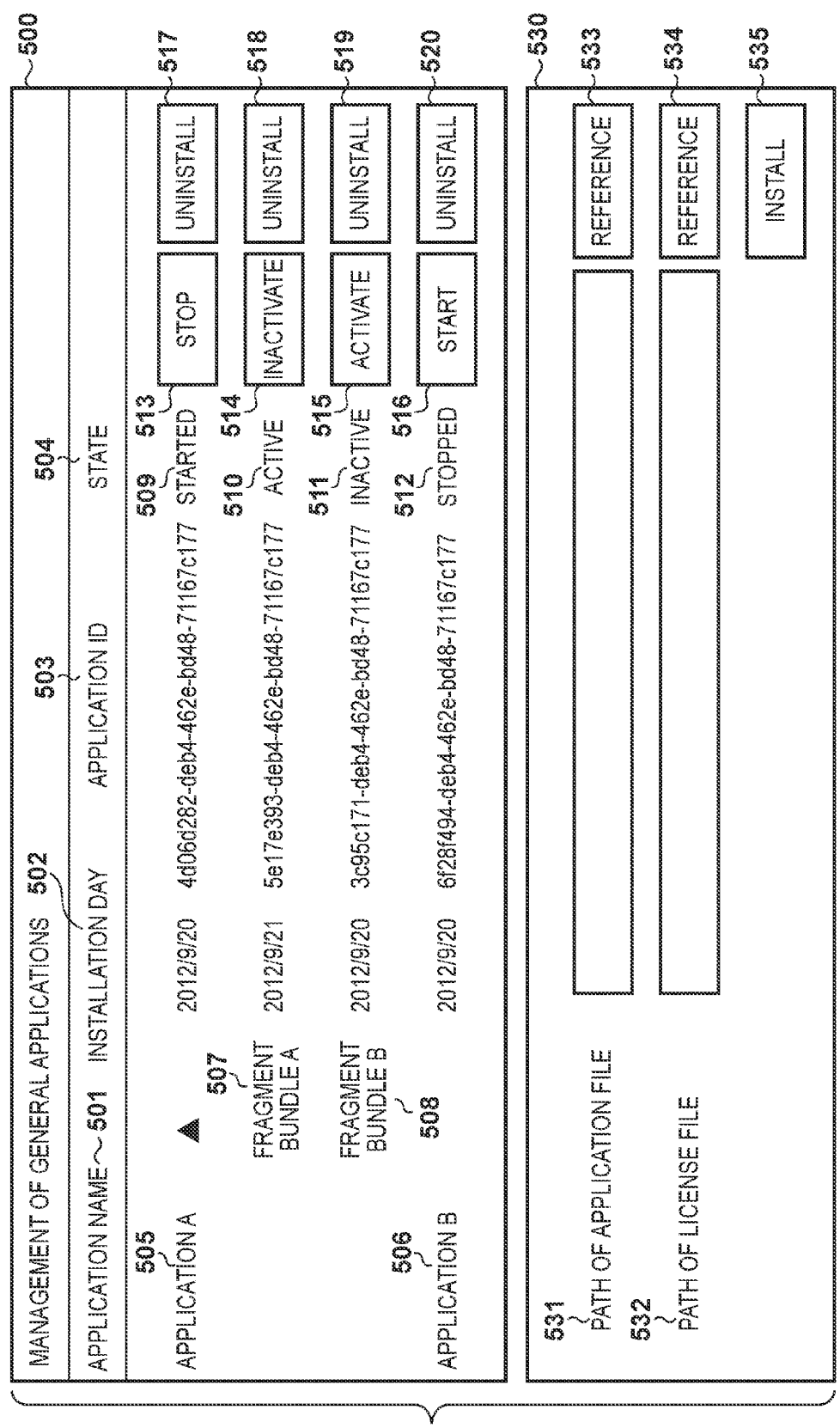
FIG. 5 is a view for illustrating an example configuration of an app management screen and an installation screen.

An app installation UI 301 configured by a WEB page illustrated in an installation screen 530 of FIG. 5 is displayed on a WEB browser (not shown) of the PC 300. A user designates an app they wish to install from the installation UI 301, and makes an instruction for installation. The app management service 208 receives the instruction for installation of the app designated by the installation UI 301, and passes it to the installation control service 207. The installation control service 207 obtains an app file based on the received instruction, and makes a request for installation to the OSGi 206. The OSGi 206, using the obtained app file, performs an app installation. The installed app is managed by the app management service 208.

Figure 4:
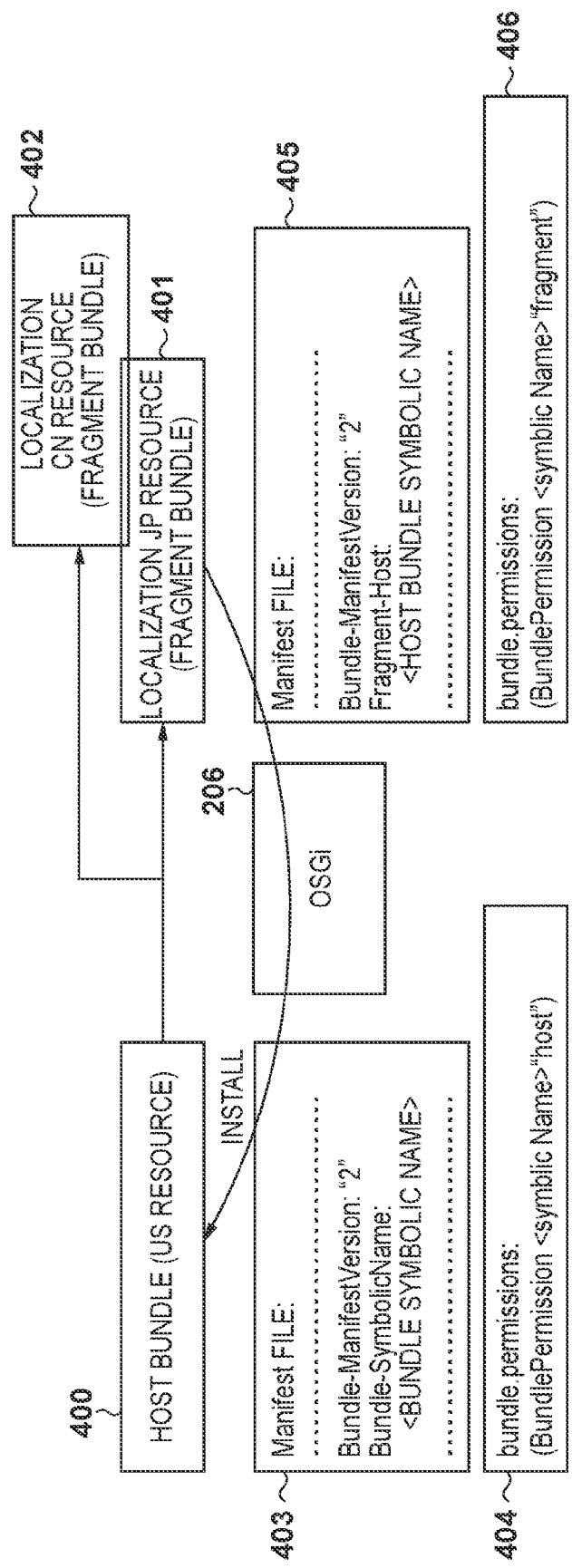
FIG. 4 is a view for explaining a configuration and a relationship of bundles.

FIG. 4 is a view for explaining a configuration and a relationship of bundles. Here, an example in which for a host bundle 400, 2 fragment bundles 401 and 402 comprising language localization resources (JP and CN) are installed is illustrated. In order to install the fragment bundles in the host bundle, the following manifest files and bundle permissions designation are necessary under the stipulations of the OSGi 206.

a manifest file 403 of the host bundle Bundle-Manifest-Version is designated to be "2"

To Bundle-SymbolicName a unique name is added in the framework a manifest file 405 of the fragment bundle Bundle-ManifestVersion is designated to be "2"

For Fragment-Host <host bundle symbolic name> recited in the manifest file 403 of the host bundle is designated. The fact that these values match indicates that the host bundle and the fragment bundle are components of the same app.

a permission 404 of the host bundle BundlePermission [bundle symbolic name, HOST]

a permission 406 of the fragment bundle BundlePermission [bundle symbolic name, FRAGMENT]

In a state in which the above described conditions are satisfied, when installing a fragment bundle, based on the manifest information of the fragment bundle, the OSGi 206 identifies the corresponding host bundle, and adds a class path of the fragment bundle to the class path of the host bundle. A "class path" is information for designating from what location the Java VM 203 should read the class file when executing a Java app. A class file includes Java byte code which can be executed on the Java VM 203. Furthermore, by a class loader (not shown) of the host bundle, all classes and resources in the fragment bundle are loaded. A "class loader" is an object that handles the loading of classes and the searching for resources, and all classes are loaded in the Java VM 203 by the class loader, and can be used from the app. Execution of the loading by the class loader of the host bundle is performed upon the start of the host bundle, and therefore it is always necessary to load after having first stopped the host bundle, and added the class path. Accordingly, in a case where the host bundle is not stopped, installation of the fragment bundle fails. After the fragment bundle is installed, it can be used as a portion of the host bundle.

In the present example, a Japanese resource and a Chinese resource are installed in the host bundle 400 which is the main unit as the fragment bundles 401 and 402, and thereafter, the host bundle 400 can switch the language of the UI display using these language resources. In other words, while the standard display on the UI of the host bundle 400 is in English, it is possible to extend the functions of the host bundle 400 so as to display in Japanese or Chinese by installing new language resources, and designating the switching of the resources on the UI.

An example of a case where the host bundle is a log in app is given. In such a case, a configuration in which the host bundle handles basic processing related to authentication, and, for example, and the fragment bundle adds a UI function for logging in by information that an IC card holds when the IC card is held up is possible.

[App Management]

Using FIG. 5 to FIG. 7, explanation will be given for a host bundle and fragment bundle management method in an app management screen that the app management service 208 provides. Also, explanation will be given for temporarily installing a fragment bundle, and for activation/inactivation of a fragment bundle.

FIG. 5 is a view for illustrating an example configuration of a management screen 500 and the installation screen 530 for a general app in the app management service 208. Here, explanation is given with a general app management screen, but a similar screens is assumed for a log in app management screen.

Firstly, explanation will be given for the management screen 500 for general apps. An application name 501 displays a name of a general app that is managed. In the case of the example illustrated in FIG. 5, an application A 505 and an application B 506 are managed. Furthermore, the application A 505 is assumed to be a host bundle, and a fragment bundle A 507 and a fragment bundle B 508 are managed. Also, display is performed so that it can be seen that the fragment bundles are associated with the host bundle. Here, the fragment bundle A 507 and the fragment bundle B 508 are displayed in association with the application A 505.

An installation day 502 indicates a date that a respective app was installed. An application ID 503 displays an application ID (identification information) assigned uniquely to a respective app. A state 504 indicates a state of a respective app. If the app is in a started state, "started" is displayed; if the state is a stopped state, "stopped" is displayed. Also, in a case where a target is a fragment bundle, in a case where the fragment bundle is installed in a host bundle "active" is displayed in the state 504, and in a case of temporary install state indicated in FIG. 6, "inactive" is displayed. A start button 516 and a stop button 513 are instruction buttons for switching start/stop of an app. The stop button is displayed for an app in the started state, and the start button is displayed for an app in the stopped state. An activation button 515 and an inactivation button 514 are buttons for instructing the switching of active/inactive of a fragment bundle. When the stop button 513 of an app in the started state (the present example, the application A 505") is pressed, the state 504 is changed to "stopped". On the other hand, when the start button 516 of an app in the stopped state (the present example, the application B 506") is pressed, the state 504 is changed to "started". When the inactivation button 514 of an app in the active state (the present example, the fragment bundle A 507") is pressed, the state 504 is changed to "inactive". On the other hand, when the activation button 515 of an app in the inactive state (the present example, the fragment bundle B 508") is pressed, the state 504 is changed to "active".

Uninstall buttons 517 to 520 are buttons for instructing to uninstall respective apps. In an uninstallation of a fragment bundle, only the fragment bundle is the target of the uninstallation. For example, in a case where an uninstall button 518 of the fragment bundle A 507 is pressed, only the fragment bundle A 507 is uninstalled. On the other hand, when an uninstall button 517 of the application A 505 which is a host bundle is pressed, in addition to the application A 505, the fragment bundle A 507 and the fragment bundle B 508 which are associated are also simultaneously uninstalled.

Next, explanation will be given for the installation screen 530. When a reference button 533 is pressed, a screen (not shown) for selecting a file path is displayed. When an app file is designated on this selection screen, the path to the app file is input in a path 531 for the application file. There are cases where for an app a license file for decoding the app is necessary in the install process from the perspective of security, business, or the like. When a reference button 534 is pressed, a screen (not shown) for selecting a file path is displayed. When a license file is designated on this selection screen, the path to the license file is input in a path 532 for the license file. When an install button 535 is pressed, an installation of the app designated in the path 531 of the application file is started. In a case where a fragment bundle is designated for installation, the fragment bundle is first temporarily installed.

Figure 6:
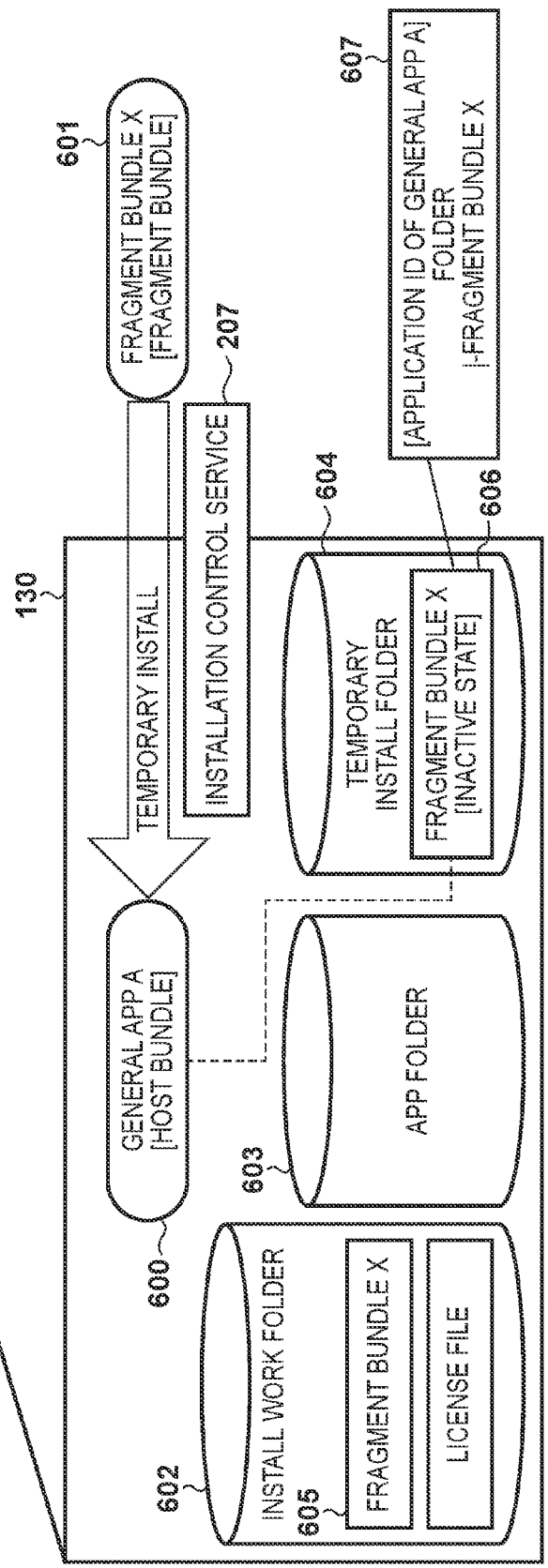
FIG. 6 is a view for explaining a temporary install state of a fragment bundle.

FIG. 6 is a view for explaining a temporary install state of a fragment bundle. A case in which for a general app A 600 which is a host bundle a fragment bundle X 601 which is a fragment bundle is temporarily installed is illustrated.

The installation control service 207, using a simultaneously designated license file, decodes the fragment bundle X 601, and lays out an install work folder 602. Thereafter, the installation control service 207 identifies, based on host bundle information recited in the manifest file of a fragment bundle X 605 which is decoded, that the associated host bundle is the general app A 600. On top of this, the installation control service 207 lays out a fragment bundle X 606 in a temporary install folder 604 which is a memory area. A fragment bundle laid out in the temporary install folder 604 is in a temporary install state, and is not under the management of the OSGi 206. Also, as is denoted by reference numeral 607, the fragment bundle X 606 is laid out under a folder whose folder name is the unique app ID of the general app A 600 which is the host bundle.

Figure 7:
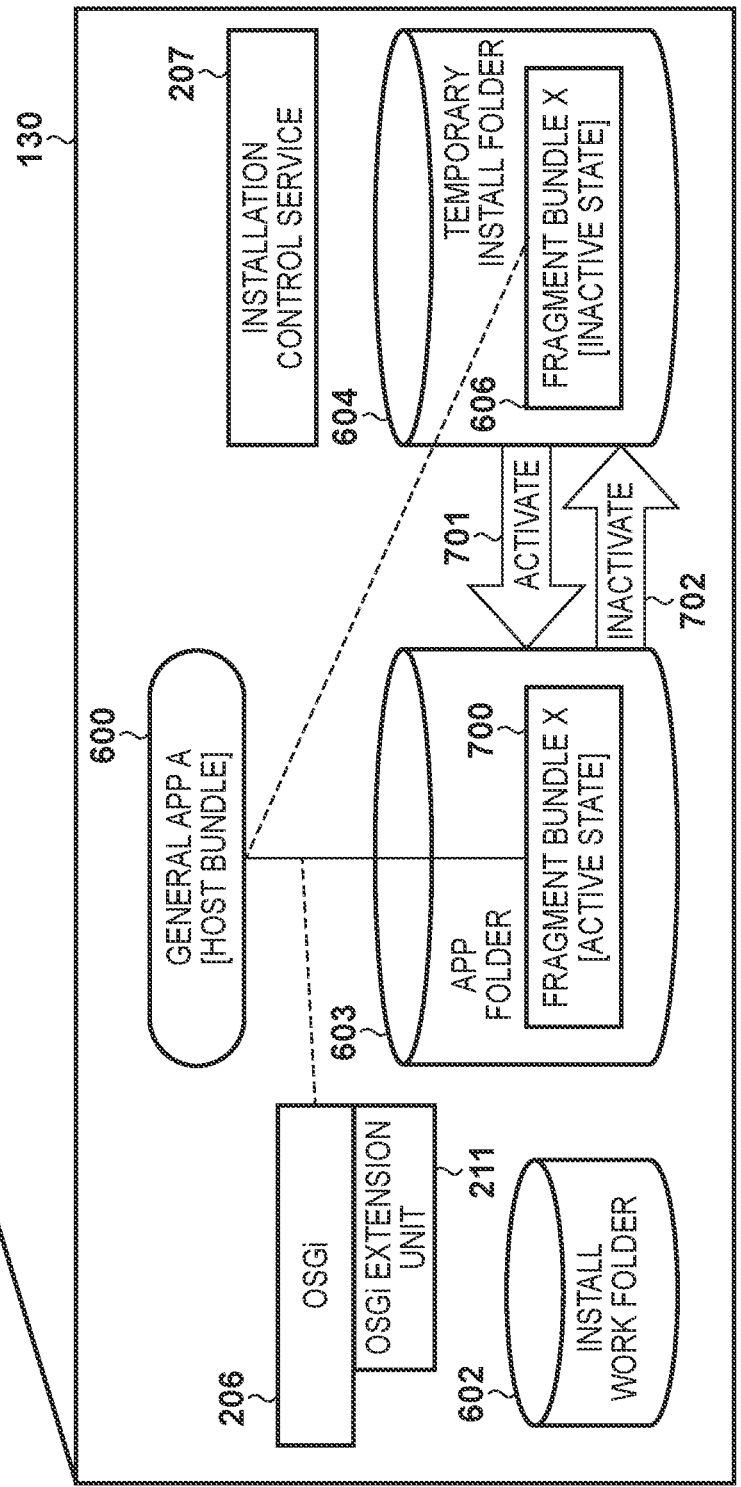
FIG. 7 is a view for explaining activation/inactivation of a fragment bundle.

FIG. 7 is a view for explaining activation/inactivation of the fragment bundle X 606 which is temporarily installed in FIG. 6. By an activation instruction 701 of the user, the installation control service 207 performs activation processing for the fragment bundle X 606 which is temporarily installed in the inactive state. The installation control service 207 activates the fragment bundle X 606, i.e. installs by moving it into an app folder 603 which is a memory area by installing in the host bundle (here, the general app A 600). In this state it is under the management of the OSGi 206, and the OSGi 206 holds a relationship between the general app A 600 and the fragment bundle X 606. Note that after the fragment bundle X 606 is activated, the fragment bundle X 606 can be used as a portion of the general app A 600. In this state, by starting the general app A 600, the fragment bundle X 606 enters the started state.

On the other hand, by an inactivation instruction 702 of the user, the installation control service 207 performs inactivation processing for a fragment bundle X 700 which is installed in the active state. By inactivation processing, the fragment bundle X 700 once again is caused to be moved into the temporary install folder 604, and is laid out in the inactive state. Because in this state it is not under the management of the OSGi 206, the OSGi extension unit 211 holds a relationship between the general app A 600 and the fragment bundle X 606. Note that after the fragment bundle X 700 is inactivated, the fragment bundle X 700 cannot be used as a portion of the general app A 600. That is, in this state, even if the general app A 600 is started, the fragment bundle X 606 is in the stopped state. Note that in the present specification, for convenience, the temporary install folder 604 is referred to as the first memory area and the app folder 603 is recited as "the second memory area".

Figure 8:
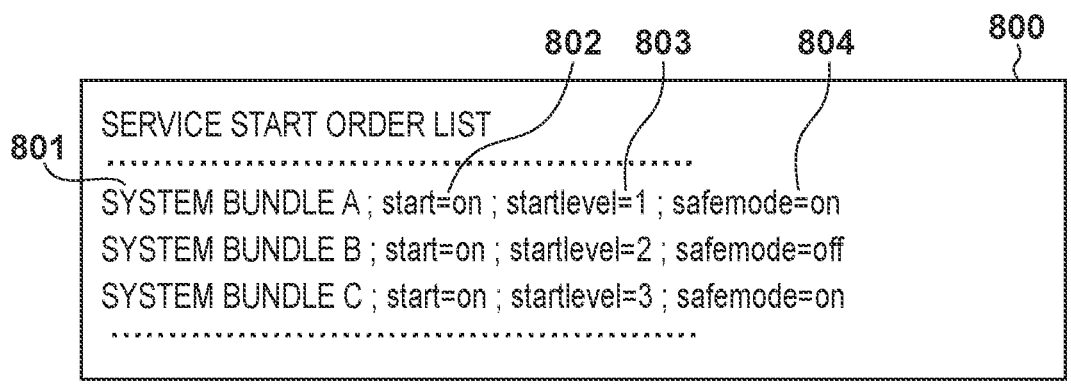
FIG. 8 is a view for illustrating an example configuration of a service start order list.

FIG. 8 illustrates an example of content of a service start order list 800. An item 801 is a name for identifying an app. Note that in place of the name, a unique app ID (identification information) may be designated in order to uniquely identify an app. An item 802 is a setting for designating that an initial state of an app is started/stopped. A host bundle is the target of started/stopped. An item 803 indicates a start level of an app, and the OSGi 206 installs bundles laid out in firmware in order from the smallest numerical value, and controls to the initial state in accordance with the setting of the item 802. An item 804 is a setting for designating that the state of the app upon a safe mode start is started/stopped; in a case where on is designated, the app is started, and in a case where "off" is designated, the app is stopped. Host bundles are the targets of started/stopped, and fragment bundles are non-targets of the designation. Also, a general app that a user installs, is handled as set to "off" upon the safe mode start.

Figure 9:
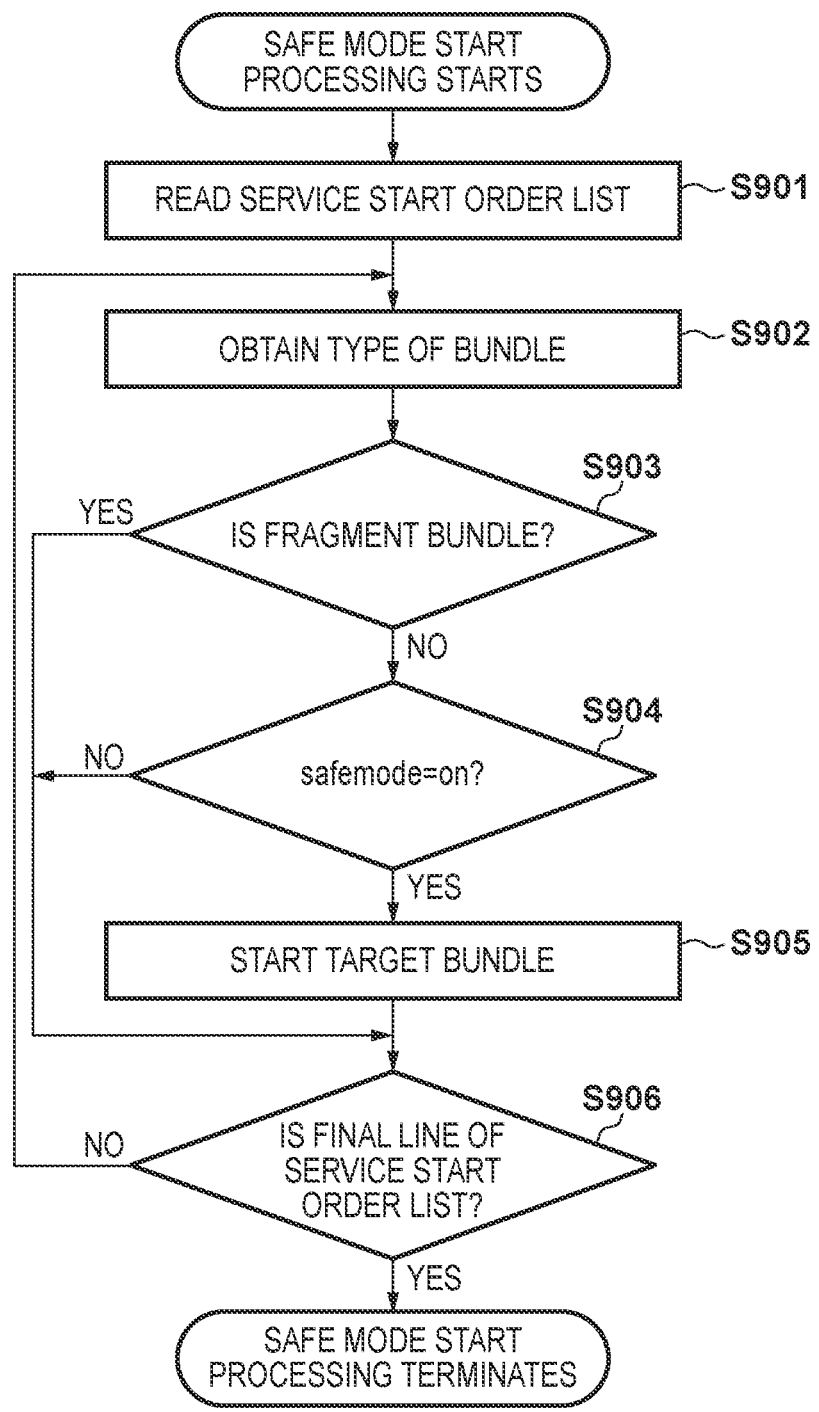
FIG. 9 is a flowchart for start processing of a host bundle upon a safe mode start.

FIG. 9 is a flowchart for explaining starting a host bundle in a safe mode start. This processing is realized by the CPU 101 reading a program stored in the HDD 104, or the like, and executing it.

When safe mode start processing is started, in step S901, the OSGi 206 reads the service start order list 800, and starts the processing in order from a head line in the list. In step S902, the OSGi 206 obtains the type of the bundle. In step S903, the OSGi 206 confirms whether or not the type of the bundle obtained in step S902 corresponds to a fragment bundle. In a case where it corresponds to a fragment bundle (YES in step S903), the processing proceeds to step S906, and in a case where it does not correspond to a fragment bundle, i.e. in a case where it is a host bundle (NO in step S903), the processing proceeds to step S904. In step S904, the OSGi extension unit 211 confirms whether or not the item 804 of the bundle of interest is on (i.e. whether or not safemode=on). In a case where safemode=off (NO in step S904), the processing proceeds to step S906, and in a case where safemode=on (YES in step S904), the processing proceeds to step S905. In step S905, the OSGi 206 starts the target bundle (i.e., the host bundle). In step S906, the OSGi 206 confirms whether or not it is the final line of the list. In a case where it is not the final line (NO in step S906), the processing returns to step S902, and the processing is repeated making the next line (the next bundle) the target of processing. In a case where processing has completed for all of the bundles in the service start order list (YES in step S906), the processing for the safe mode start terminates.

Above, explanation was given for a safe mode start whose target is host bundles. Next, an embodiment in which the safe mode start includes fragment bundles will be illustrated.

Figure 10:
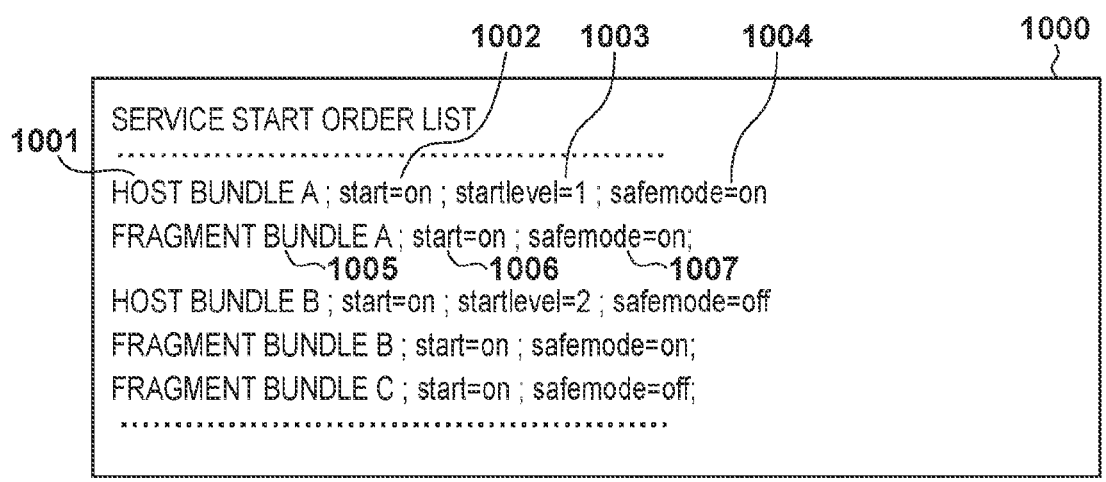
FIG. 10 is a view for illustrating an example configuration of a service start order list in accordance with a first embodiment.

FIG. 10 illustrates an example of content of a service start order list 1000. Items 1001-1004 in the service start order list 1000 are the same as the items 801-804 illustrated in FIG. 8, and explanation thereof will be omitted. An item 1005 is a name for identifying a fragment bundle. Note that in place of the name, a unique app ID may be designated in order to uniquely identify a fragment bundle. An item 1006 is a setting for designating that the initial state of the fragment bundle is active/inactive. An item 1007 is a setting for designating that a state of a fragment bundle upon the safe mode start is active/inactive, and in a case where on is designated, the fragment bundle is activated, and in a case where "off" is designated, the fragment bundle is inactivated. Also, a general app that a user installs, is handled as set to "off" upon the safe mode start.

Figure 11:
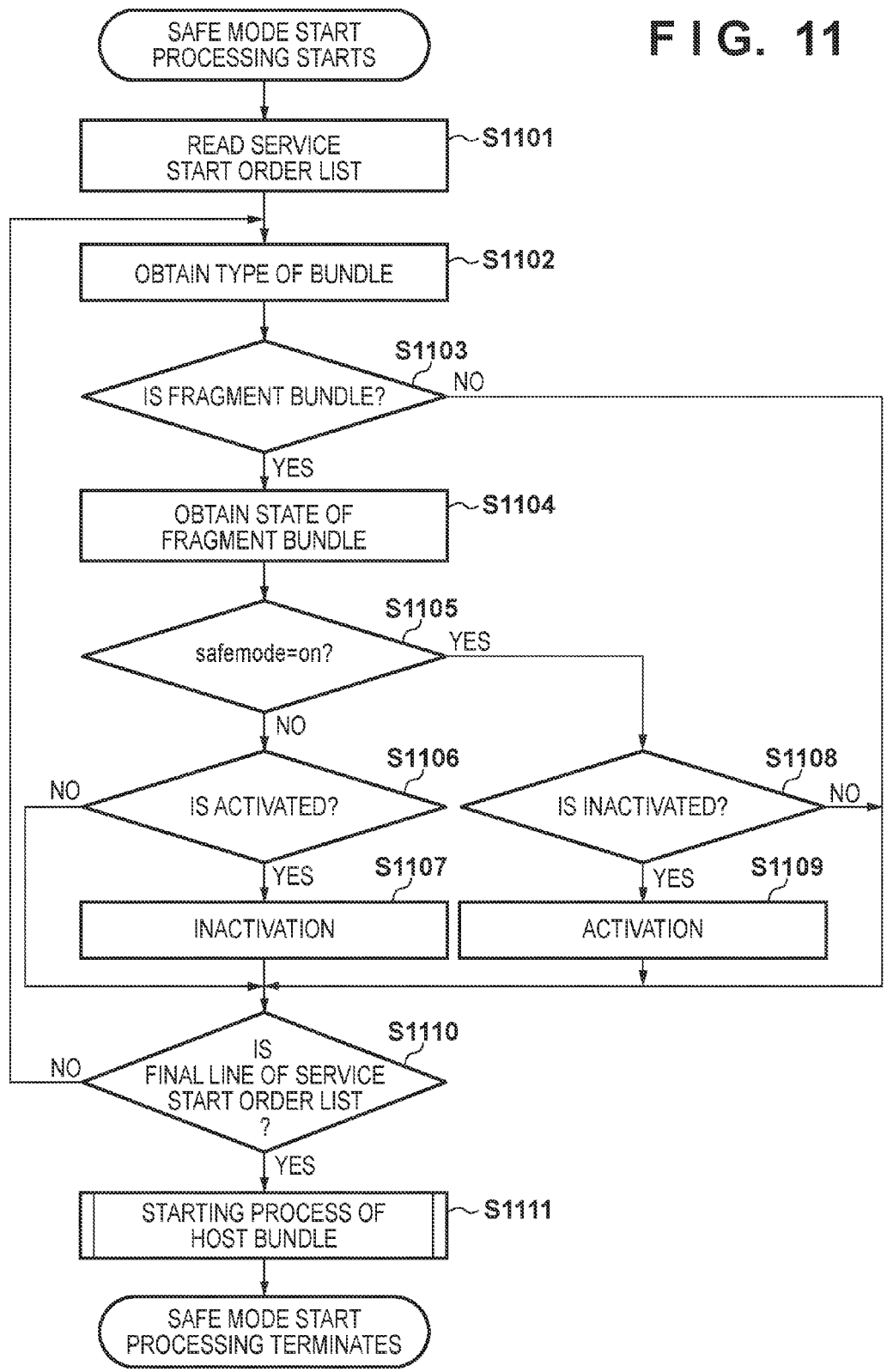
FIG. 11 is a flowchart for processing upon a safe mode start in accordance with the first embodiment

FIG. 11 is a flowchart for explaining processing for when a safe mode start including a host bundle and a fragment bundle.

When the safe mode start processing is started, in step S1101, the OSGi 206 reads the service start order list 1000, and starts the processing in order from a head line in the list. In step S1102, the OSGi extension unit 211 obtains the type of the bundle. In step S1103, the OSGi extension unit 211 confirms whether or not the type of the bundle obtained in step S1102 corresponds to a fragment bundle. In a case where it does not correspond to a fragment bundle (NO in step S1103), the processing proceeds to step S1110, and in a case where it does correspond to a fragment bundle (YES in step S1103), the processing proceeds to step S1104.

In step S1104, the OSGi extension unit 211 obtains the activated/inactivated state of the fragment bundle. In step S1105, the OSGi extension unit 211 confirms whether or not the item 1007 is on (i.e. whether or not safemode=on). In a case where safemode=off (NO in step S1105), the processing proceeds to step S1106, and in a case where safemode=on (YES in step S1105), the processing proceeds to step S1108. In step S1106, the OSGi extension unit 211 confirms whether or not the state of the fragment bundle obtained in step S1104 is activated. More specifically, in a case where the fragment bundle is stored in the temporary install folder 604, it is determined that it is inactivated, and in a case where the fragment bundle is stored in the app folder 603, it is determined that it is activated. In the case where it is not activated (NO in step S1106), the processing proceeds to step S1110, and in a case where it is activated (YES in step S1106), the processing proceeds to step S1107. In step S1107, the OSGi extension unit 211 performs inactivation processing. After that, the processing proceeds to step S1110.

In step S1108, the OSGi extension unit 211 confirms whether or not the state of the fragment bundle obtained in step S1104 is inactivated. In the case where it is not inactivated (NO in step S1108), the processing proceeds to step S1110, and in a case where it is inactivated (YES in step S1108), the processing proceeds to step S1109. In step S1109, the OSGi extension unit 211 performs activation processing. After that, the processing proceeds to step S1110.

In step S1110, the OSGi extension unit 211 confirms whether or not it is the final line of the list. In a case where it is not the final line (NO in step S1110), the processing returns to step S1102, and the processing is repeated making the next line (the next bundle) the target of processing. In a case where processing has completed for all of the bundles in the service start order list (YES in step S1110), the processing proceeds to step S1111. For processing of step S1111, because it is the same explanation as for step S901 to step S906 illustrated in FIG. 9, explanation is omitted. Next, the processing of the safe mode start terminates.

Figure 12:
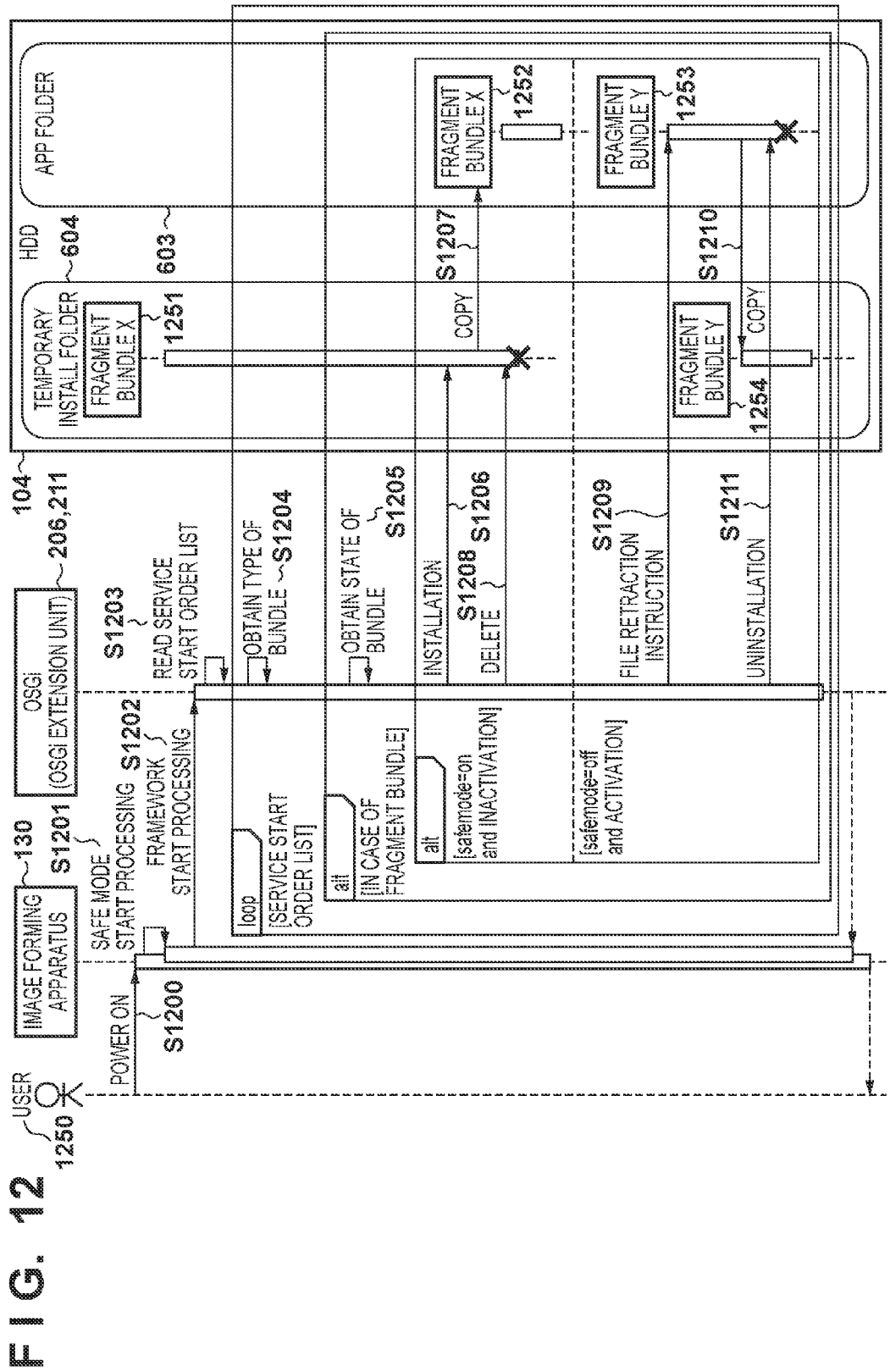
FIG. 12 is a sequence diagram for explaining processing upon a safe mode start in accordance with the first embodiment

FIG. 12 is a view for illustrating a flow of processing of each service, and a flow of data for a case when the image forming apparatus 130 starts in the safe mode until the fragment bundle is temporarily installed.

In step S1200, when a user 1250 turns ON a power supply of the image forming apparatus 130 in a safe mode start, the safe mode start processing of step S1201 starts. In step S1202, the image forming apparatus 130 calls framework start processing of the OSGi 206. In step S1203, the OSGi extension unit 211 reads the service start order list 1000. In step S1204, the OSGi extension unit 211 obtains the type of the bundle. In a case where the type of the bundle is a fragment bundle, the OSGi extension unit 211 obtains information of the state of the bundle in step S1205. In a case where the item 1007 is on and the state of the fragment bundle is the inactivated state, the OSGi extension unit 211, in step S1206, performs an installation of the fragment bundle. In step S1207, the OSGi extension unit 211 copies an app file 1251 laid out in the temporary install folder 604 to the app folder 603 as an app file 1252. In step S1208, the OSGi extension unit 211 deletes the app file 1251 laid out in the temporary install folder 604. By the foregoing flow, the fragment bundle in the inactivated state enters the activated state.

Meanwhile, in a case where the item 1007 is "off" and the state of the fragment bundle is the activated state, the OSGi extension unit 211, in step S1209, performs a file retraction instruction. In step S1210, the OSGi extension unit 211 copies an app file 1253 laid out in the app folder 603 to the temporary install folder 604 as an app file 1254. In step S1211, the OSGi 206 performs uninstallation processing and deletes the app file 1253 laid out in the app folder 603. By the foregoing flow, the fragment bundle in the activated state enters the inactivated state.

By virtue of the present embodiment, it is possible to increase convenience by, upon the safe mode start, inactivating a fragment bundle for which there is a possibility that a problem is included and thereby starting the system safely and activating necessary fragment bundles.

Second Embodiment

In the present embodiment, a case is considered in which upon the safe mode start, after inactivating or activating a fragment bundle, once again, the image forming apparatus is started in a normal operation mode (normal mode). There is a problem in that in a case where upon the safe mode start a fragment bundle cannot be used, a fragment bundle for which usage is stopped by the system cannot be used in the subsequent normal mode start either. With respect to this, for example, it can be considered that there is demand for being able to resume usage upon the subsequent normal mode start even in a case where usage of a fragment bundle that a user installed and started to use is stopped in a safe mode start.

Figure 13:
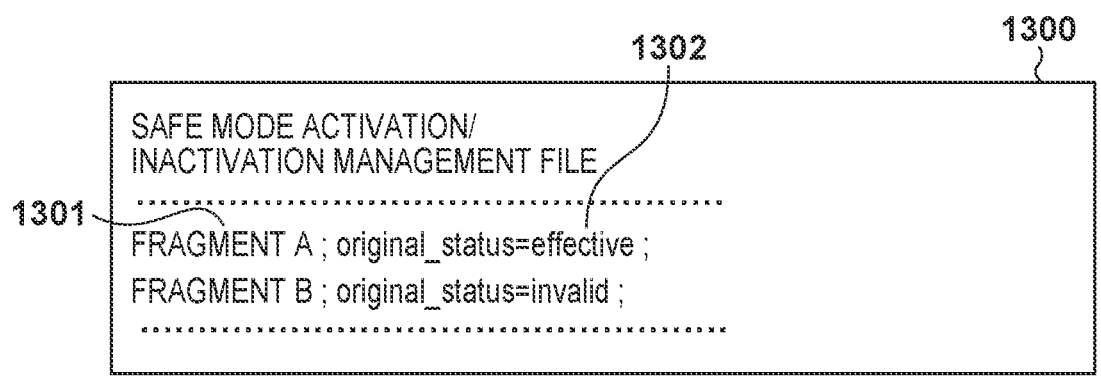
FIG. 13 is a view for illustrating an example configuration of a safe mode activation/inactivation management file in accordance with a second embodiment.

FIG. 13 is a view for illustrating an example of content of a safe mode activation/inactivation management file 1300 according to the present embodiment. An item 1301 is a name for identifying a fragment bundle. Note that in place of the name, a unique app ID may be designated in order to uniquely identify an app. An item 1302 records an original state of a fragment bundle (a state prior to the safe mode start); "effective" indicates that the original state is the active state, and "invalid" indicates that the original state is the inactive state. Based on the content recorded upon the above described safe mode start, a determination is performed as to which state to return the fragment bundle to upon the subsequent normal mode start.

Note that in a case where during the safe mode start the activation button 515/the inactivation button 514 of the fragment bundle is pressed on the management screen 500, the OSGi extension unit 211 deletes information of the fragment bundle which is the operation target from the safe mode activation/inactivation management file. This is performed to prioritize a user operation performed during the safe mode start. Also, in a case where uninstall buttons 518 and 519 are pressed on the management screen 500, the OSGi extension unit 211 deletes information of the fragment bundle which is the operation target from the safe mode activation/inactivation management file 1300. Furthermore, the same is true for a case where uninstall buttons 517 and 520 of host bundles are pressed. In other words, by the information being deleted from the safe mode activation/inactivation management file 1300, each bundle is started in a state designated in the service start order list 1000 upon the subsequent normal mode start.

[Process Flow]

Figure 14:
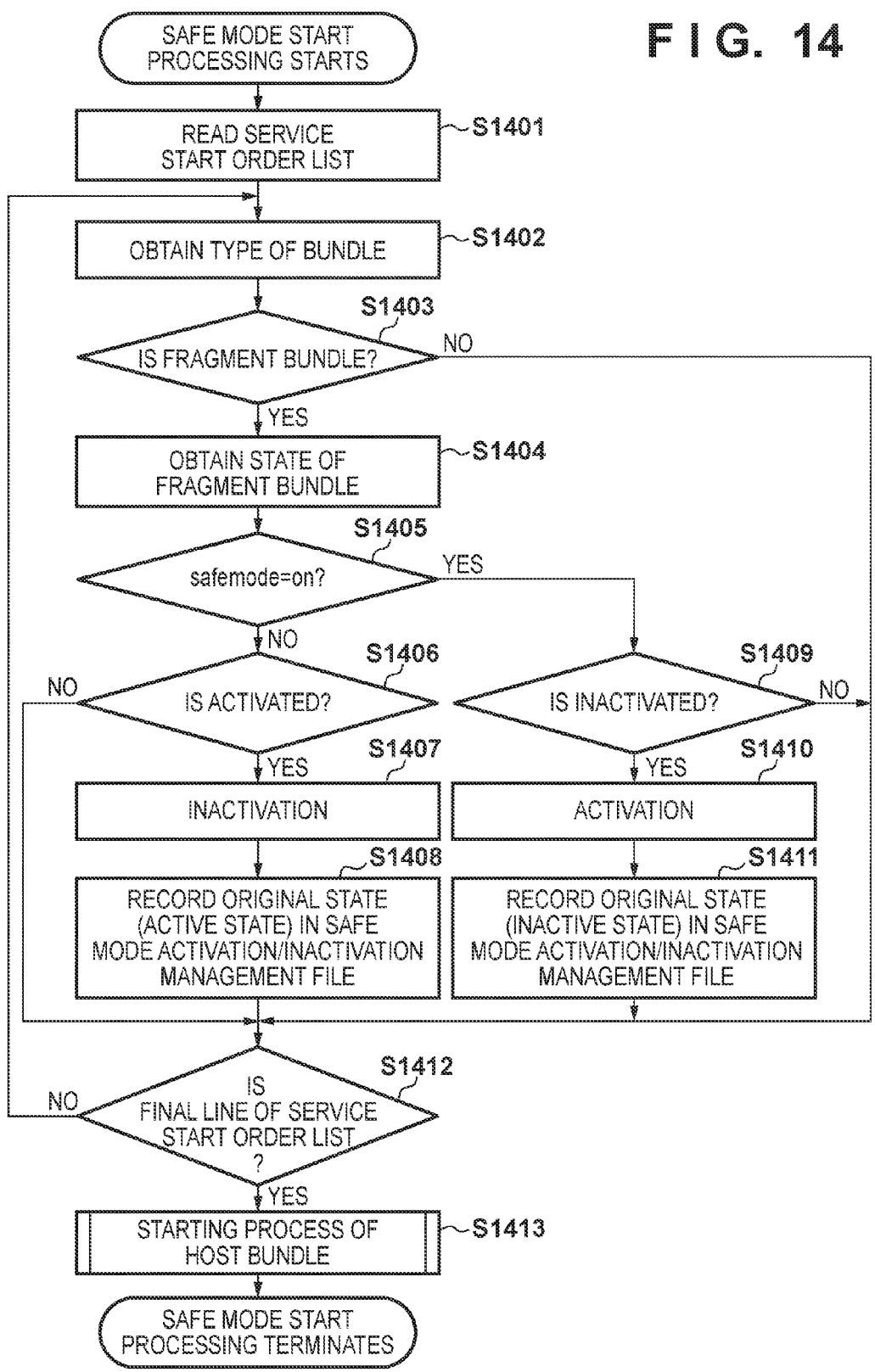
FIG. 14 is a flowchart for processing upon a safe mode start in accordance with the second embodiment.

FIG. 14 is a flowchart for processing upon a safe mode start according to the present embodiment. Note that the processing of step S1401 to S1407, step S1409 to S1410, and step S1412 to S1413 is the respectively same as that of step S1101 to S1107, and step S1108 to S1111 illustrated in FIG. 11 of the first embodiment, and therefore explanation thereof will be omitted. In other words, here, the processing of step S1408 and step S1411 is added newly.

In step S1408, the OSGi extension unit 211 records the name of the inactivated fragment bundle and "effective" indicating the original state in the safe mode activation/inactivation management file 1300.

On the other hand, in step S1411, the OSGi extension unit 211 records the name of the activated fragment bundle and "invalid" indicating the original state in the safe mode activation/inactivation management file 1300.

Figure 15:
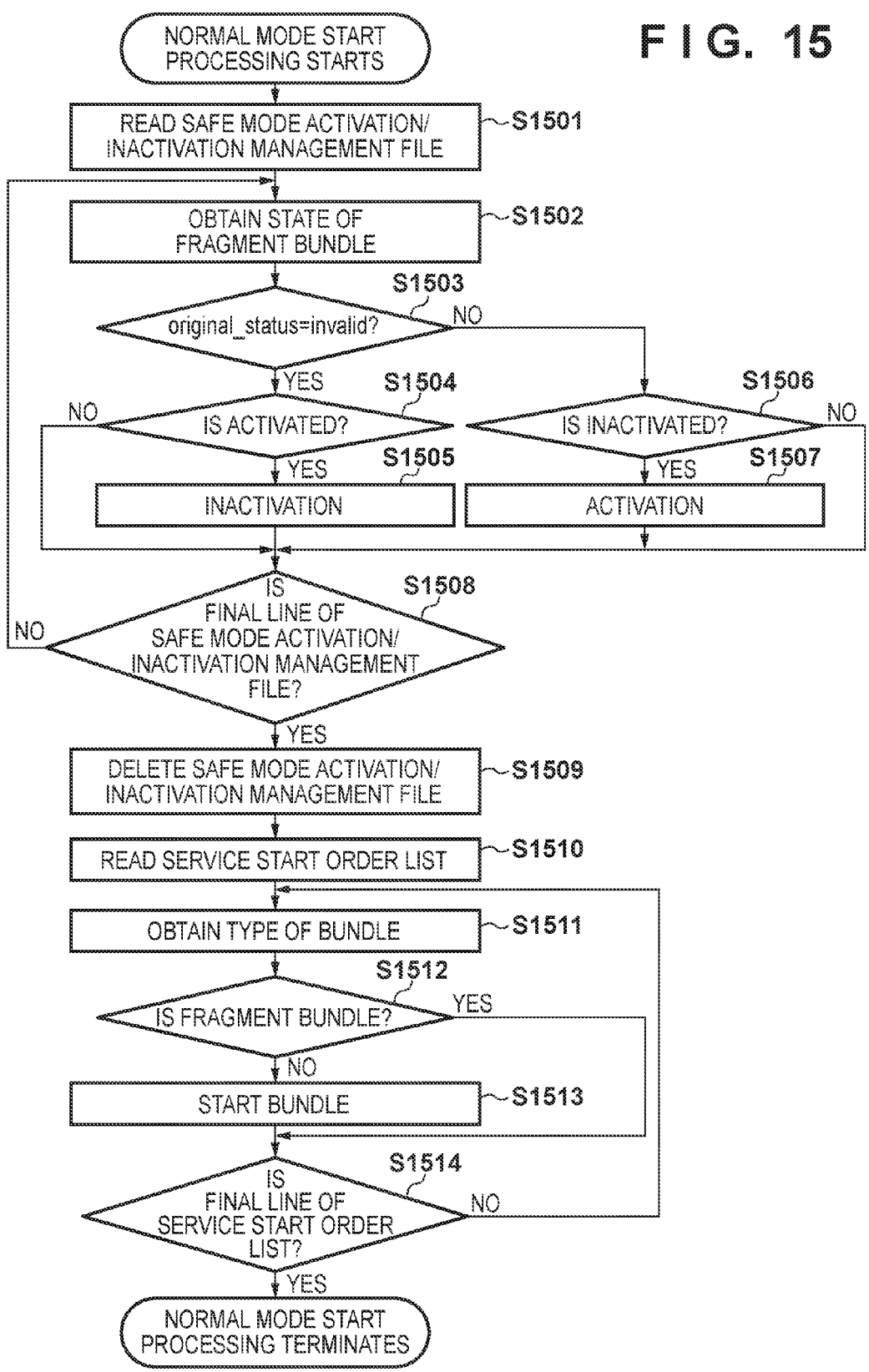
FIG. 15 is a flowchart for processing upon a normal mode start in accordance with the second embodiment.

FIG. 15 is a flowchart for processing upon a normal mode start according to the present embodiment.

When the normal mode start processing is started, in step S1501, the OSGi extension unit 211 reads the safe mode activation/inactivation management file 1300, and starts the processing in order from a head line in the list. In step S1502, the OSGi extension unit 211 obtains the activated/inactivated state of the fragment bundle corresponding to the item 1301. In step S1503, the OSGi extension unit 211 confirms the value of the item 1302, and determines whether or not it is "invalid". In a case where original_status=invalid (YES in step S1503), the processing proceeds to step S1504, and in a case where original_status=effective, (NO in step S1503), the processing proceeds to step S1506.

In step S1504, the OSGi extension unit 211 confirms whether or not the state of the fragment bundle obtained in step S1502 is activated. In a case where a fragment bundle is not activated (NO in step S1504), the processing proceeds to step S1508, and in a case where the fragment bundle is activated (YES in step S1504), the processing proceeds to step S1505. In step S1505, the OSGi extension unit 211 performs inactivation processing. After that, the processing proceeds to step S1508.

In step S1506, the OSGi extension unit 211 confirms whether or not the state of the fragment bundle obtained in step S1502 is inactivated. In a case where a fragment bundle is not inactivated (NO in step S1506), the processing proceeds to step S1508, and in a case where the fragment bundle is inactivated (YES in step S1506), the processing proceeds to step S1507. In step S1507, the OSGi extension unit 211 performs activation processing. After that, the processing proceeds to step S1508.

In step S1508, the OSGi extension unit 211 confirms whether or not it is the final line of the list. In a case where it is not the final line (NO in step S1508), the processing returns to step S1502, and the processing is repeated setting the next line in the safe mode activation/inactivation management file 1300 as the target of processing. In a case where the processing has completed for all fragment bundles in the safe mode activation/inactivation management file 1300 (YES in step S1508), the processing proceeds to step S1509.

In step S1509, the OSGi extension unit 211 deletes the safe mode activation/inactivation management file 1300. In step S1510, the OSGi 206 reads the service start order list 1000, and starts the processing in order from a head line in the list. In step S1511, the OSGi 206 obtains the type of the bundle. In step S1512, the OSGi 206 confirms whether or not the type of the bundle obtained in step S1511 corresponds to a fragment bundle. In a case where it does correspond to a fragment bundle (YES in step S1512) the processing proceeds to step S1514, and in a case where it does not correspond to a fragment bundle (NO in step S1512), the processing proceeds to step S1513. In step S1513, the OSGi 206 starts the bundle. In step S1514, the OSGi 206 confirms whether or not it is the final line of the list. In a case where it is not the final line (NO in step S1514), the processing returns to step S1511, and the processing is repeated setting the next line in the service start order list 1000 as the target of processing. In a case where it is the final line, i.e. in a case where processing has completed for all of the bundles in the service start order list 1000 (YES in step S1514), the normal mode start up processing terminates.

By virtue of the present embodiment, even when a fragment bundle is inactivated or activated upon the safe mode start, it becomes possible to return to a state prior to the safe mode start when starting in the normal mode thereafter.

Third Embodiment

In the present embodiment, a case in which a fragment bundle that is installed by a user is activated upon the safe mode start is considered. There is a problem in that in a case where in the safe mode start all of the fragment bundles that a user installed are inactivated, even when there is a fragment bundle desired to be activated, it cannot be used, and usability is degraded. For example, in a case where a fragment bundle that localizes a display language of a user interface for a host bundle which is a system app that is started in the safe mode start is inactivated, it can be considered that the operability of the user will be degraded.

Figure 16:
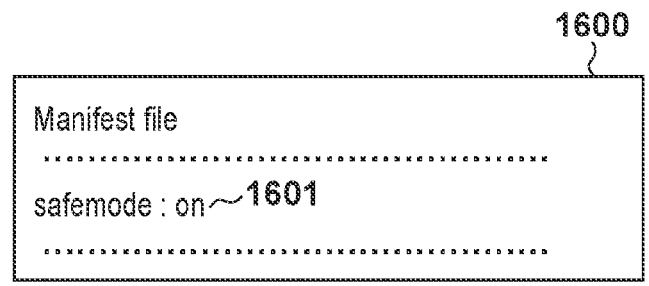
FIG. 16 is a view for illustrating an example configuration of a manifest file in accordance with a third embodiment.

FIG. 16 is a view for illustrating an example of content of a manifest file 1600 of an app according to the present embodiment. An item 1601 is a setting for designating that the state upon the safe mode start is active/inactive for a fragment bundle that the user installed. In the case of activation on is designated, and in the case of inactivation "off" is designated. In a case where the item 1601 is omitted, it is treated as though "off" were designated. Also, even if the item 1601 is designated for a system app, if the designation of the item 804 of the service start order list 800 is "on", the designation of the item 804 is prioritized.

Figure 17:
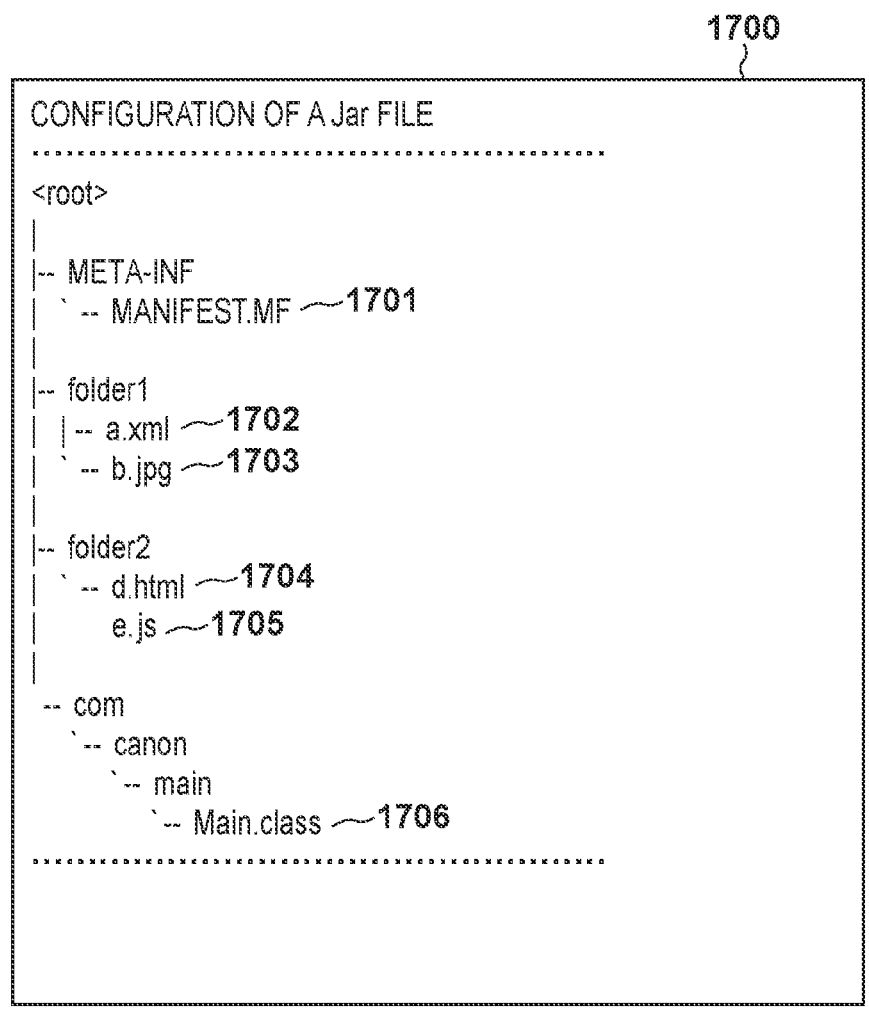
FIG. 17 is a view for illustrating an example configuration of a bundle file in accordance with the third embodiment.

FIG. 17 illustrates an example of file configuration of an app, here it illustrates a configuration in a Jar file. A file 1701 is a manifest file of an app. A file 1702 is a setting file. A file 1703 is an image file. A file 1704 is an HTML (Hyper Text Markup Language) file. A file 1705 is a script file described in JavaScript (registered trademark). A file 1706 is a class file including Java (registered trademark) byte code that can be executed on the Java VM 203. That is, the class file is a program file including byte code in which processing to be executed is defined. Meanwhile, an image file, or the like, is a resource file used in processing. Note that the file configuration of FIG. 17 is only an example, and so long as the requirements as a JavaArchive file format are satisfied, there is no particular restriction on the configuration of file. Also, in the present embodiment, while the class file is assumed to be the target of the file of a predetermined format, limitation is not made to this.

[Process Flow]

Figure 18:
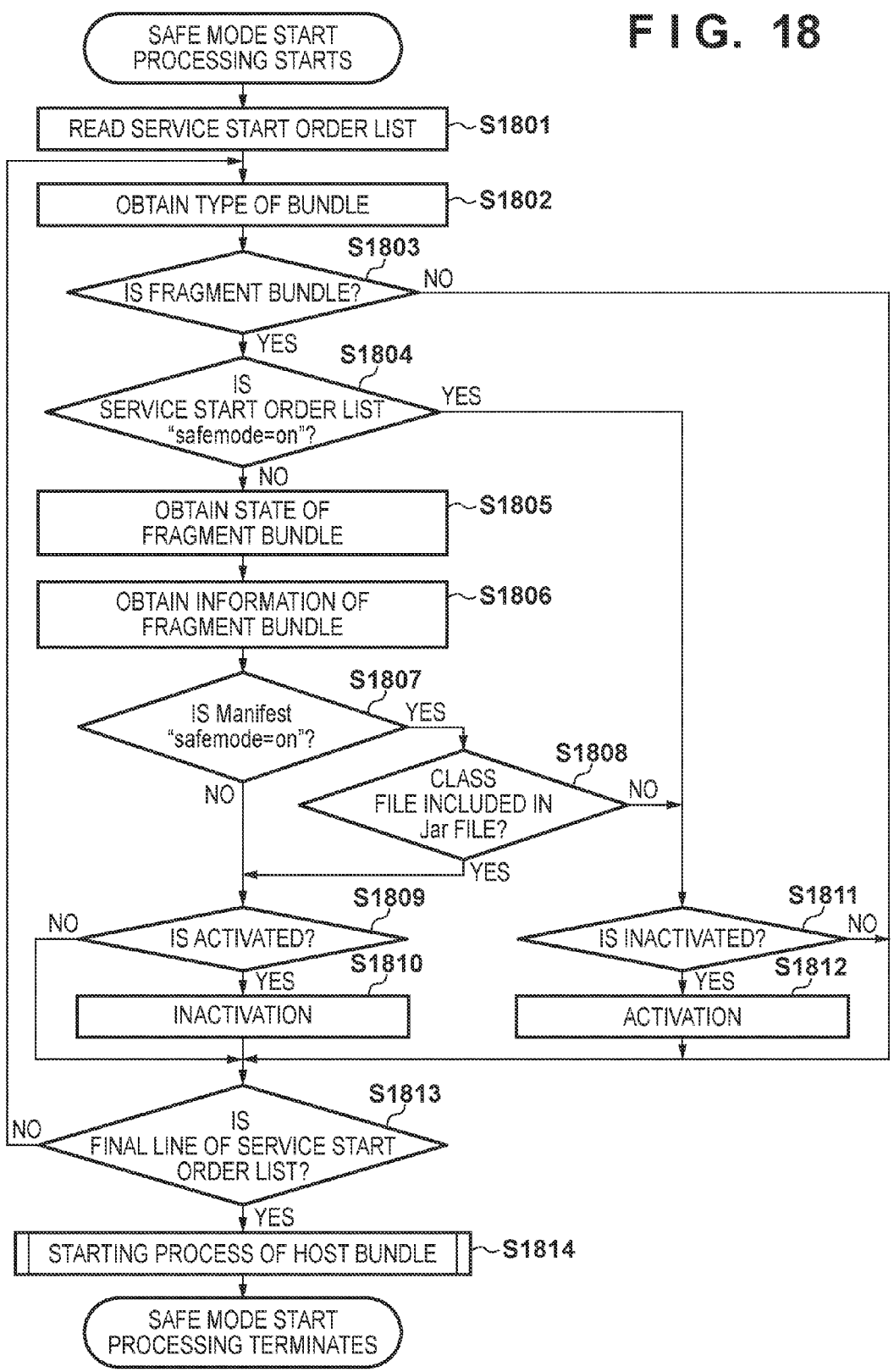
FIG. 18 is a flowchart for processing upon a safe mode start in accordance with the third embodiment

FIG. 18 is a flowchart for processing upon a safe mode start according to the present embodiment.

When the safe mode start processing is started, in step S1801, the OSGi extension unit 211 reads the service start order list 1000, and starts the processing in order from a head line in the list. In step S1802, the OSGi extension unit 211 obtains the type of the bundle. In step S1803, the OSGi extension unit 211 confirms whether or not the type of the bundle obtained in step S1802 corresponds to a fragment bundle. In a case where it does not correspond to a fragment bundle (NO in step S1803), the processing proceeds to step S1813, and in a case where it does correspond to a fragment bundle (YES in step S1803), the processing proceeds to step S1804.

In step S1804, the OSGi extension unit 211 confirms whether or not the designation of the item 804 of the service start order list 800 is "on". In a case where safemode=off (NO in step S1804), the processing proceeds to step S1805, and in a case where safemode=on (YES in step S1804), the processing proceeds to step S1811.

In step S1805, the OSGi extension unit 211 obtains the activated/inactivated state of the fragment bundle. In step S1806, the OSGi extension unit 211 obtains information of the fragment bundle. More specifically, the item 1601 of the file 1701 and information related to whether or not a class file including Java (registered trademark) byte code exists in files 1702 to 1706 are obtained. In step S1807, the OSGi extension unit 211 confirms whether or not the item 1601 obtained in step S1806 is "on". In a case where safemode=off (NO in step S1807), the processing proceeds to step S1809, and in a case where safemode=on (YES in step S1807), the processing proceeds to step S1808.

In step S1808, the OSGi extension unit 211 confirms whether or not a class file including Java (registered trademark) byte code exists in a file obtained in step S1806. In a case where it does exist (YES in step S1808), the processing proceeds to step S1809, and in a case where it does not exist (NO in step S1808), the processing proceeds to step S1811. A reason for checking whether or not a class file (file of a predetermined format) exists is to avoid a later described host bundle start failing by a class file having a problem being read by the class loader of the host bundle. That is, in a case where it is comprised of files other than a class file (for example, only resource files), even though the fragment bundle is installed the starting of the host bundle failing can be avoided.

The processing of step S1809 to step S1814 is the same as step S1106 to step S1111 of FIG. 11 illustrated in the first embodiment respectively, and so explanation will be omitted.

By virtue of the present embodiment, it becomes possible to prevent a degradation in the convenience of the user upon the safe mode start, by starting the system safely even when a fragment bundle that the user installed is activated.

Fourth Embodiment

In the present embodiment, a case in which there is a problem in a fragment bundle when the fragment bundle that is installed by a user is activated is considered. In the third embodiment, in a case where there exists a class file including Java (registered trademark) byte code that can be executed on a Java VM, it is not activated. However, the user desires activation in a case where a class file including Java (registered trademark) byte code is included, but it is known that there is no influence on the safe mode start. Accordingly, in the present embodiment, a fragment bundle for which a problem does not occur, and a host file thereof are activated. On the other hand, on top of inactivating a fragment bundle for which a problem does occur, control is performed to activate the host bundle thereof.

[Process Flow]

Figure 19A:
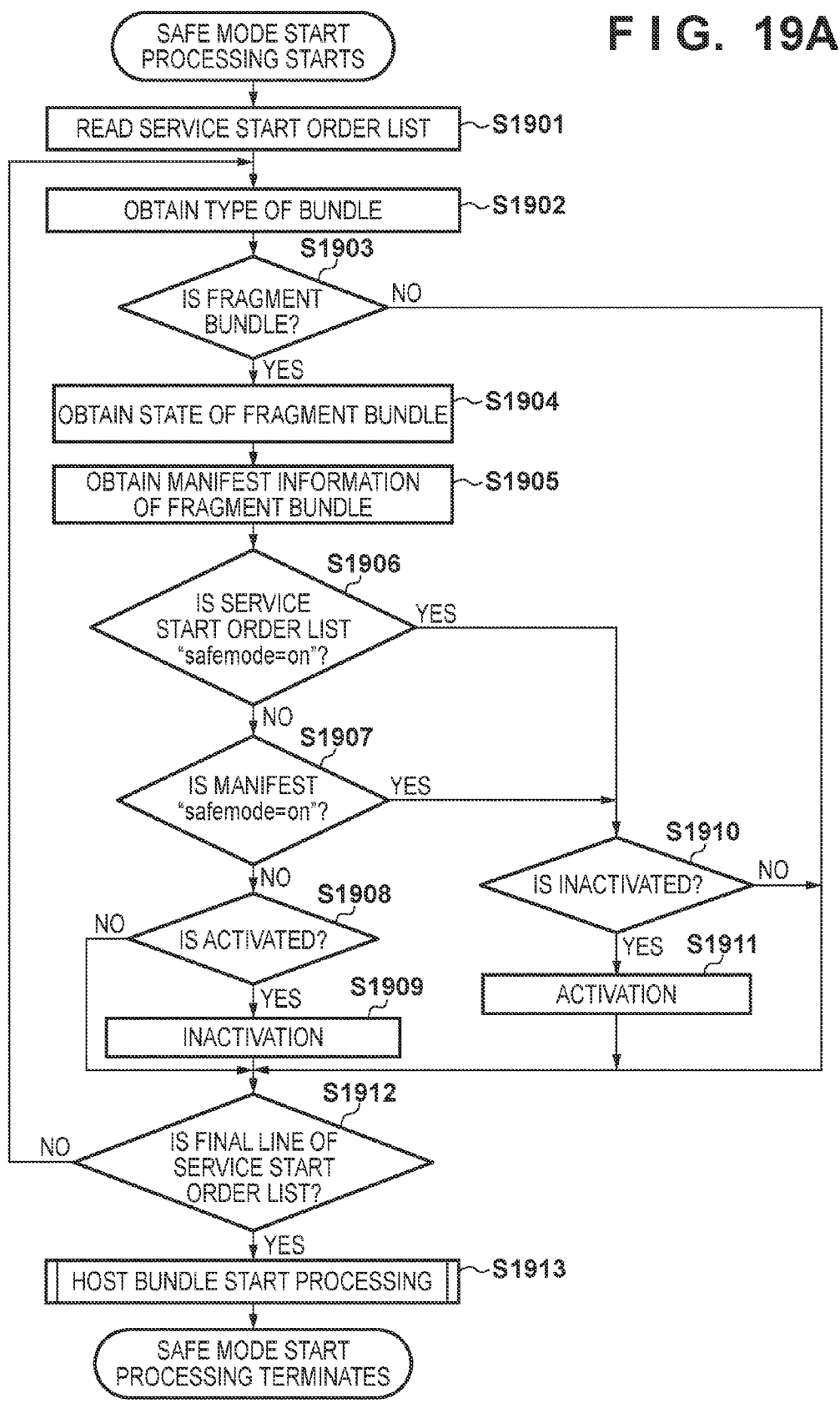
FIGS. 19A and 19B are flowcharts for processing upon a safe mode start in accordance with a fourth embodiment.
Figure 19B:
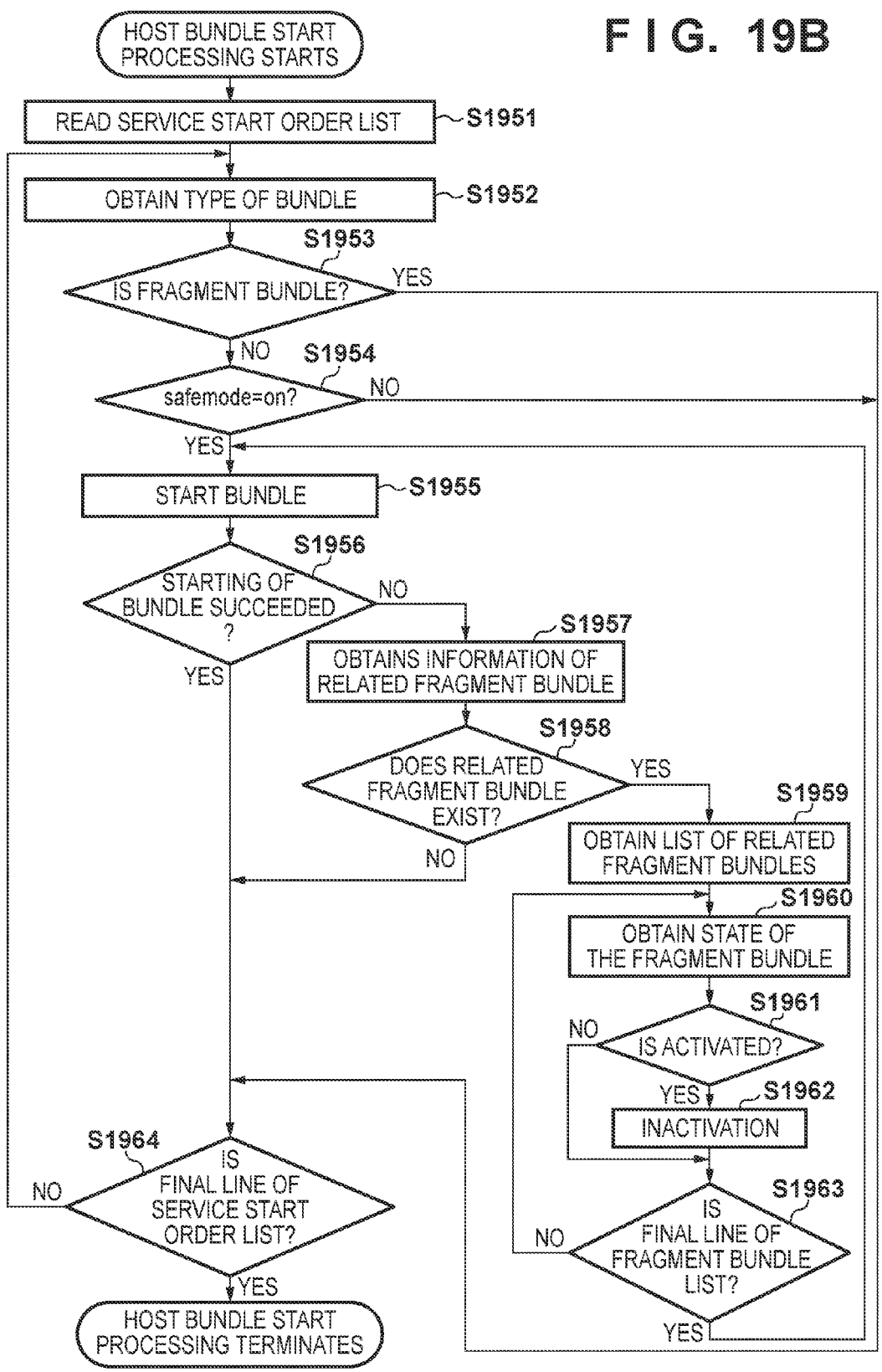

FIGS. 19A and 19B are flowcharts for processing upon a safe mode start according to the present embodiment.

Firstly, in FIG. 19A, when the safe mode start processing is started, in step S1901, the OSGi extension unit 211 reads the service start order list 1000, and starts the processing in order from a head line in the list. In step S1902, the OSGi extension unit 211 obtains the type of the bundle. In step S1903, the OSGi extension unit 211 confirms whether or not the type of the bundle obtained in step S1902 corresponds to a fragment bundle. In a case where it does not correspond to a fragment bundle (NO in step S1903), the processing proceeds to step S1912, and in a case where it does correspond to a fragment bundle (YES in step S1903), the processing proceeds to step S1904.

In step S1904, the OSGi extension unit 211 obtains the activated/inactivated state of the fragment bundle. In step S1905, the OSGi extension unit 211 obtains the item 1601 of the manifest file 1600 of the fragment bundle. In step S1906, the OSGi extension unit 211 confirms whether or not the designation of the item 804 of the service start order list 800 is "on". In a case where safemode=off (NO in step S1906), the processing proceeds to step S1907, and in a case where safemode=on (YES in step S1906), the processing proceeds to step S1910.

In step S1907, the OSGi extension unit 211 confirms whether or not the item 1601 obtained in step S1905 is "off". In a case where safemode=off (NO in step S1907), the processing proceeds to step S1908, and in a case where safemode=on (YES in step S1907), the processing proceeds to step S1910.

The processing of step S1908 to step S1912 is the same as step S1106 to step S1110 of FIG. 11 illustrated in the first embodiment respectively, and so explanation will be omitted. For step S1913, detailed explanation is given using FIG. 19B.

Firstly, in FIG. 19B, when the host bundle start processing is started, in step S1951, the OSGi extension unit 211 reads the service start order list 800, and starts the processing in order from a head line in the list. Note that the processing of step S1951 to step S1955 is the same as step S901 to step S905 of FIG. 9 illustrated in the first embodiment respectively, and so explanation will be omitted.

In step S1956, the OSGi extension unit 211 confirms whether or not the start of the bundle performed in step S1955 succeeded. In a case where it does succeed (YES in step S1956), the processing proceeds to step S1964, and in a case where it fails (NO in step S1956), the processing proceeds to step S1957. In step S1957, the OSGi extension unit 211 obtains information of a fragment bundle related to the host bundle for which starting failed. In step S1958, the OSGi extension unit 211 confirms whether or not a fragment bundle exists from the information obtained in step S1957. In a case where one does not exist (NO in step S1958), the processing proceeds to step S1964, and in a case where one does exist (YES in step S1958), the processing proceeds to step S1959.

In step S1959, the OSGi extension unit 211 obtains a list (not shown) of fragment bundles related to the host bundle for which starting failed, and starts processing from the head line of the list. In step S1960, the OSGi extension unit 211 obtains the activated/inactivated state of the fragment bundle. In step S1961, the OSGi extension unit 211 confirms whether or not the state of the fragment bundle obtained in step S1960 is activated. In a case where a fragment bundle is not activated (NO in step S1961), the processing proceeds to step S1963, and in a case where the fragment bundle is activated (YES in step S1961), the processing proceeds to step S1962. In step S1962, the OSGi extension unit 211 performs inactivation processing. After that, the processing proceeds to step S1963.

In step S1963, the OSGi extension unit 211 confirms whether or not it is the final line of the list. In a case where it is not the final line (NO in step S1963), the processing returns to step S1960, and the processing is repeated making the next line (the next fragment bundle) the target of processing. In a case where it is the final line, i.e. inactivation processing has completed for all of the fragment bundles related to the host bundle for which starting failed (YES in step S1963), the processing proceeds to step S1955. Then, in step S1955, the OSGi extension unit 211 attempts to start once again the host bundle for which starting failed.

In step S1964, the OSGi 206 confirms whether or not it is the final line of the service start order list. In a case where it is not the final line (NO in step S1964), the processing returns to step S1952, and the processing is repeated making the next line the target of processing. In a case where it is the final line, i.e. in a case where processing has completed for all of the bundles in the service start order list (YES in step S1964), the processing for starting the host bundle terminates, and the processing returns to the processing of FIG. 19A.

By the present embodiment, upon the safe mode start, it becomes possible to start the system safely without degrading the convenience of the user even in a case where there is a problem with a fragment bundle that a user installed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-248420, filed Dec. 8, 2014, which is hereby incorporated by reference herein in its entirety.

What is claimed is:

1. An information processing apparatus having a normal operation mode, and a safe mode for operation restricting a function of a bundle more than in the normal operation mode, the apparatus comprising:
  an installation unit configured to install a host bundle, and to inactivate, as a temporary install, a fragment bundle added to the host bundle in order to extend a function of the host bundle, and to store the fragment bundle in a first memory area; and
  a holding unit configured to hold a list defining whether the temporarily installed fragment bundle is activated or inactivated when the information processing apparatus starts in the safe mode,
  wherein the installation unit, when the information processing apparatus starts in the safe mode, moves a fragment bundle defined to be activated in the list, out of temporarily installed fragment bundles, to a second memory area to activate that fragment bundle.

2. The information processing apparatus according to claim 1
  further comprising a recording unit configured to record, in a case where an activation or inactivation state of a fragment bundle is switched based on the list when starting in the safe mode, a state of that fragment bundle prior to the switch, wherein
  in a case where after operation of the safe mode the information processing apparatus starts in the normal operation mode, the installation unit activates or inactivates the fragment bundle to the state prior to the switch recorded by the recording unit.

3. The information processing apparatus according to claim 2
  further comprising a receiving unit configured to receive from a user an instruction to activate or inactivate the fragment bundle, wherein
  in a case where, when operating in the safe mode, the instruction to activate or inactivate the fragment bundle is received by the receiving unit, irrespective of the state recorded by the recording unit, the installation unit, when the information processing apparatus starts in the normal operation mode, activates or inactivates the fragment bundle to the state of the instruction received by the receiving unit.

4. The information processing apparatus according to claim 1, wherein, in the list, a fragment bundle added newly by a user is handled as inactivated when the information processing apparatus starts in the safe mode.

5. The information processing apparatus according to claim 1,
  further comprising a determination unit configured to determine whether or not a file of a predetermined format is included in the fragment bundle, wherein
  the installation unit, when the information processing apparatus starts in the safe mode, inactivates a fragment bundle determined by the determination unit to include the file of the predetermined format, and activates a fragment bundle determined by the determination unit not to include the file of the predetermined format.

6. The information processing apparatus according to claim 5, wherein the file of the predetermined format is a class file including byte code in which processing is defined.

7. The information processing apparatus according to claim 5, wherein the determination unit, in a case where the fragment bundle is comprised of only resource files, determines that the fragment bundle does not include the file of the predetermined format.

8. The information processing apparatus according to claim 1, wherein in a case where when the information processing apparatus starts in the safe mode, and after the installation unit activates a fragment bundle based on the list, a starting of a host bundle to which that fragment bundle is added fails, the installation unit moves that fragment bundle to the first memory area inactivating that fragment bundle, and then once again causes that host bundle to start.

9. A method for controlling an information processing apparatus having a normal operation mode, and a safe mode for operation restricting a function of a bundle more than in the normal operation mode, the apparatus comprising:
  installing a host bundle, and inactivating, as a temporary install, a fragment bundle added to the host bundle in order to extend a function of the host bundle, and storing the fragment bundle in a first memory area,
  wherein in the installing, when the information processing apparatus starts in the safe mode, a fragment bundle, out of temporarily installed fragment bundles, that is defined to be activated in a list defining whether to activate or inactivate when the information processing apparatus starts in the safe mode is caused to move to a second memory area to activate that fragment bundle.

10. A non-transitory computer-readable storage medium storing a program for causing a computer having a normal operation mode, and a safe mode for operation restricting a function of a bundle more than in the normal operation mode, to function as:
  an installation unit configured to install a host bundle, and to inactivate, as a temporary install, a fragment bundle added to the host bundle in order to extend a function of the host bundle, and to store the fragment bundle in a first memory area; and
  a holding unit configured to hold a list defining whether the temporarily installed fragment bundle is activated or inactivated when the computer starts in the safe mode,
  wherein the installation unit, when the computer starts in the safe mode, moves a fragment bundle defined to be activated in the list, out of temporarily installed fragment bundles, to a second memory area to activate that fragment bundle.

* * * * *